(12) United States Patent
Pokharel et al.

(10) Patent No.: US 12,113,838 B2
(45) Date of Patent: Oct. 8, 2024

(54) METHODS, SYSTEMS, AND APPARATUSES FOR IMPROVED CONTENT CREATION AND SYNCHRONIZATION

(71) Applicant: ON24, Inc., San Francisco, CA (US)

(72) Inventors: Shishir Pokharel, Westerville, OH (US); Jaime Andres Castillo Leon, Bogota (CO); Cobin Isaiah Smigel Dopkeen, Huntersville, NC (US); Alejandro Castera Garcia, Bogota (CO)

(73) Assignee: ON24, Inc., San Francisco, CA (US)

(*) Notice: Subject to any disclaimer, the term of this patent is extended or adjusted under 35 U.S.C. 154(b) by 0 days.

(21) Appl. No.: 17/569,110

(22) Filed: Jan. 5, 2022

(65) Prior Publication Data

US 2023/0216898 A1  Jul. 6, 2023

(51) Int. Cl.
*H04L 65/401* (2022.01)

(52) U.S. Cl.
CPC ................ *H04L 65/4015* (2013.01)

(58) Field of Classification Search
CPC ... H04L 65/4015; G06Q 10/101; G06Q 10/10
See application file for complete search history.

(56) References Cited

U.S. PATENT DOCUMENTS

| | | | |
|---|---|---|---|
| 6,560,637 B1 | 5/2003 | Dunlap et al. | |
| 8,270,815 B2 | 9/2012 | Yen et al. | |
| 8,434,002 B1 | 4/2013 | Shah et al. | |
| 11,343,470 B1 * | 5/2022 | Cronan | G06F 3/04842 |
| 2003/0174160 A1 | 9/2003 | Deutscher et al. | |
| 2005/0015719 A1 | 1/2005 | Marchon et al. | |
| 2010/0204811 A1 | 8/2010 | Transeau | |
| 2011/0026898 A1 | 2/2011 | Lussier et al. | |
| 2013/0275312 A1 | 10/2013 | Claman et al. | |
| 2015/0244758 A1 | 8/2015 | Kolowich et al. | |
| 2016/0234345 A1 * | 8/2016 | Roberts, Jr. | H04L 67/306 |
| 2017/0257405 A1 | 9/2017 | Lo et al. | |
| 2020/0053184 A1 | 2/2020 | Roberts, Jr. et al. | |
| 2020/0120363 A1 * | 4/2020 | De Decker | H04N 21/4884 |
| 2022/0270650 A1 * | 8/2022 | Kenney | G06F 16/685 |

OTHER PUBLICATIONS

PCT International Written Opinion and Serach Report for PCT Application No. PCT/US2023/010076 mailed May 10, 2023 (9 pages).

* cited by examiner

*Primary Examiner* — Lesa M Kennedy
(74) *Attorney, Agent, or Firm* — Ballard Spahr LLP

(57) ABSTRACT

Methods, systems, and apparatuses for improved content creation and synchronization are described herein. A plurality of users may collaborate via a plurality of user devices to create a media asset, such as a webinar. A first user of a first user device of the plurality of user devices may interact with first content and second content associated with the media assets. An indication of the interaction, such as metadata, may be sent by the first user device to a content server(s) and/or a database. The indication of the interaction may be used to synchronize the first content and the second content within the media asset. In this way, any editing/revision/content generation performed at any one of the plurality of user devices may be synchronized in real-time.

20 Claims, 20 Drawing Sheets

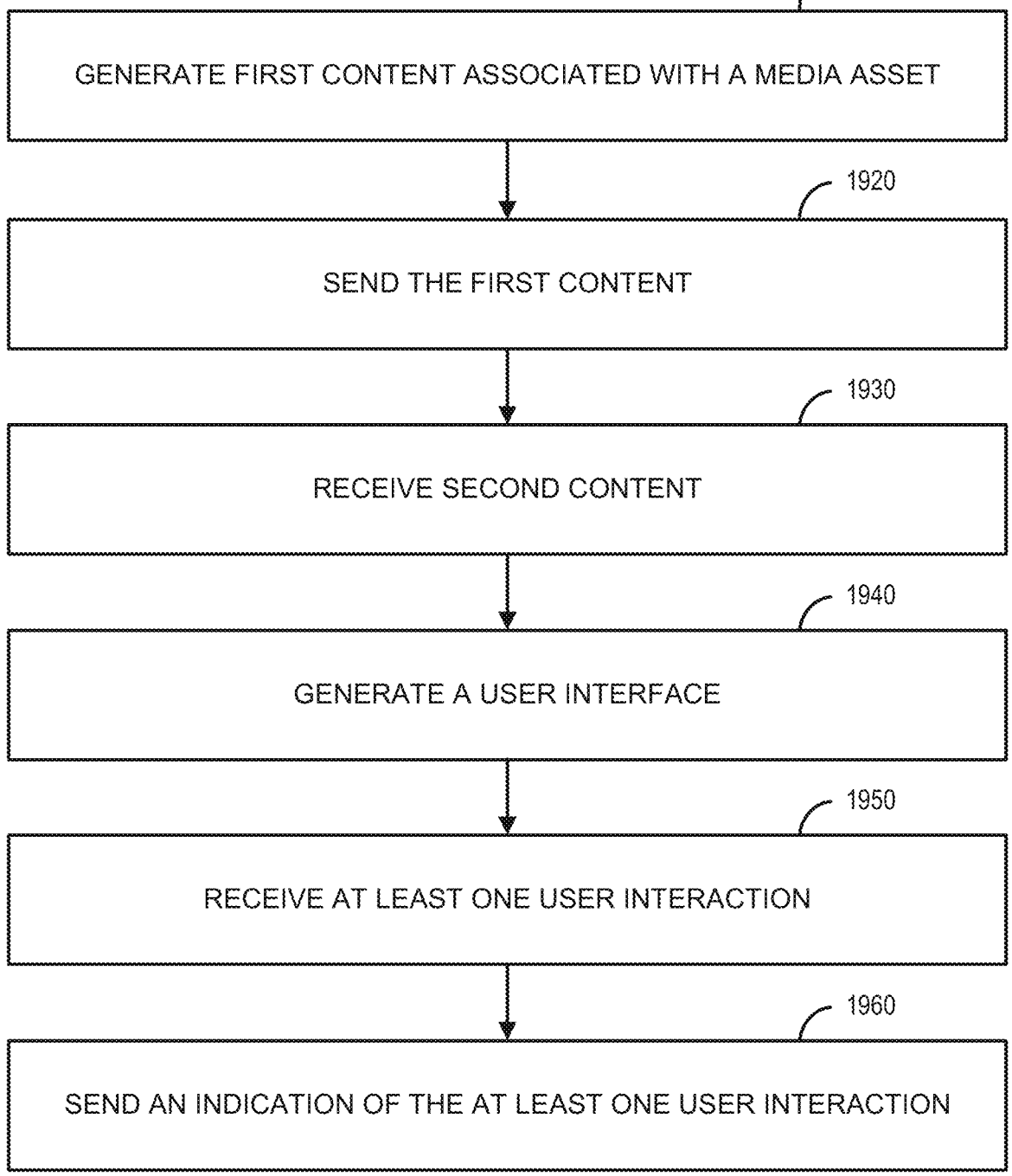

2010: RECEIVE FIRST CONTENT AND SECOND CONTENT

2020: DETERMINE A FIRST PLURALITY OF CONTENT ELEMENTS AND A SECOND PLURALITY OF CONTENT ELEMENTS

2030: SEND THE SECOND CONTENT, THE FIRST PLURALITY OF CONTENT ELEMENTS, AND THE SECOND PLURALITY OF CONTENT ELEMENTS

2040: RECEIVE AN INDICATION OF AT LEAST ONE USER INTERACTION

2050: SYNCHRONIZE THE FIRST CONTENT AND THE SECOND CONTENT WITH A MEDIA ASSET

METHODS, SYSTEMS, AND APPARATUSES FOR IMPROVED CONTENT CREATION AND SYNCHRONIZATION

BACKGROUND

Online content, such as webinars, include elements of video content, audio content, supplemental content, etc. Supplemental content needs to be synchronized with corresponding video content and audio content—and vice-versa—in order to ensure presentation of the content (e.g., output at devices) is optimal. Synchronization of such content elements during the creation process (e.g., recording process) can be difficult when multiple users are collaborating to generate the online content. These and other considerations are discussed herein.

SUMMARY

It is to be understood that both the following general description and the following detailed description are exemplary and explanatory only and are not restrictive. Methods, systems, and apparatuses for improved content creation and synchronization are described herein. In one example, a plurality of users may collaborate via a plurality of user devices to create a media asset, such as a webinar. A first user device of the plurality of user devices may be associated with a first user (e.g., a presenter of the media asset/webinar). The first user may generate first content for the media asset, such as audio, video, etc. The first user device may send the first content to a computing device in communication with the plurality of user devices, such as a conference server(s), for storage and synchronization. A second user device of the plurality of user devices may be associated with a second user (e.g., a presenter of the media asset/webinar). The second user may generate second content for the media asset, such as audio, video, etc. The second user device may send the second content to the computing device for storage and synchronization.

The first user device may generate a user interface of a production environment configured for editing the media asset. The production environment may allow the plurality of users to collaborate via the plurality of user devices to create, revise, edit, etc., the media asset. The production environment may comprise one or more elements of a studio module as described herein. The first user may interact with the production environment to edit, revise, etc., the first content or the second content. For example, a first object associated with the first content and a second object associated with the second content (e.g., waveforms of audio) may be generated at an editing element within the production environment. The first user, via the first user device, may generate at least one user interaction via the editing element with the first content or the second content by interacting with the first object or the second object (e.g., by interacting with the waveforms of audio). The first user device may send an indication of the at least one user interaction to the computing device.

The indication of the at least one user interaction may cause the computing device to synchronize the first content and the second content within the media asset. The computing device may send the indication of the at least one user interaction (e.g., metadata) to one or more content servers. The one or more content servers may store the indication of the at least one user interaction (e.g., the metadata). In this way, any editing/revision/content generation performed at any one of the plurality of user devices may be synchronized in real-time.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods, systems, and apparatuses described herein:

FIG. 19 illustrates a flowchart for an example method, in accordance with one or more embodiments of this disclosure; and FIG. 20 illustrates a flowchart for an example method, in accordance with one or more embodiments of this disclosure.

DETAILED DESCRIPTION

Figure 1:
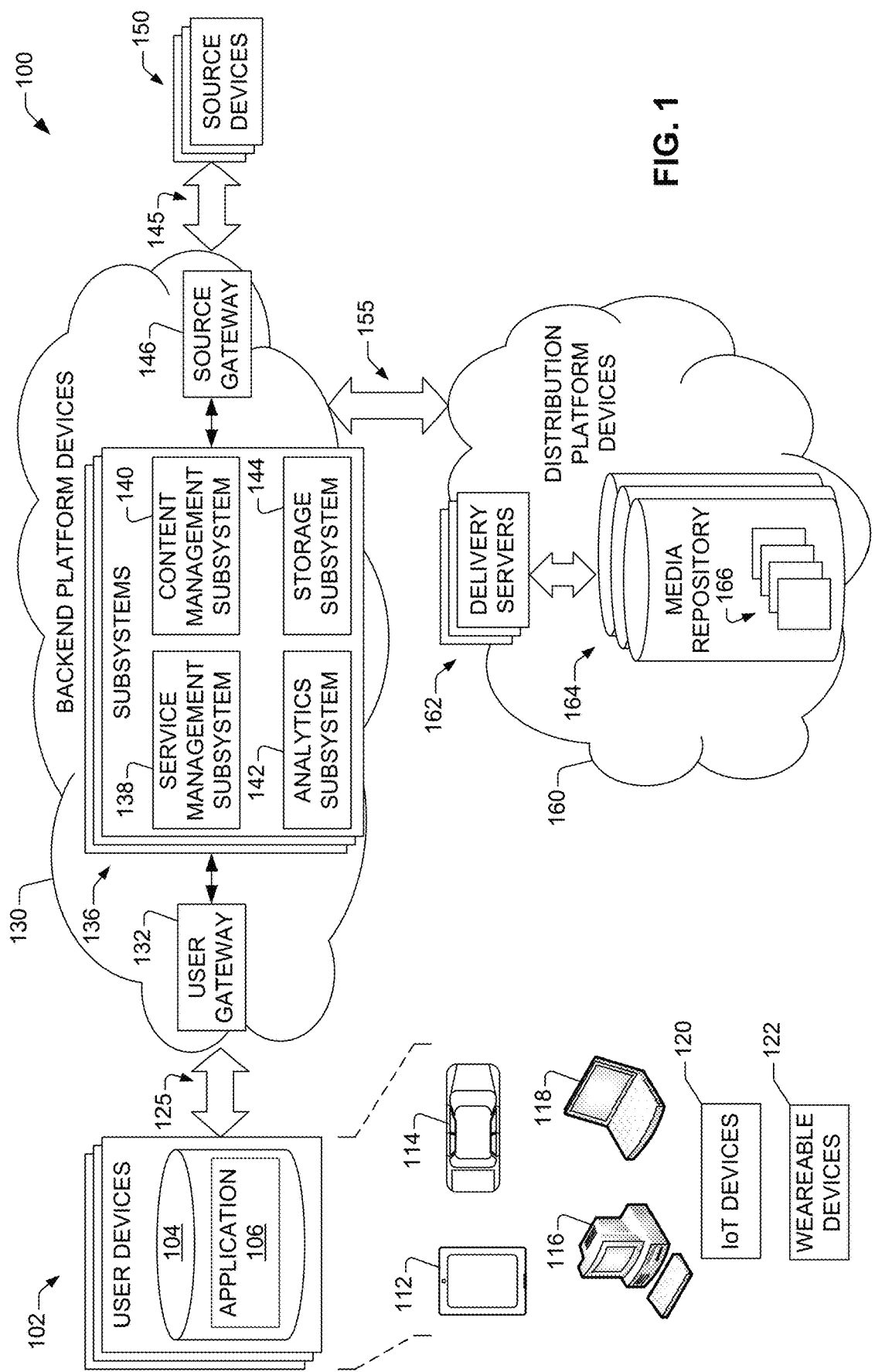
FIG. 1 illustrates an example of an operational environment that includes a presentation platform for presentation of digital content, in accordance with one or more embodiments of this disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved content creation and synchronization are described herein. A distribution platform may comprise a system of computing devices, servers, software, etc., that is configured to present media assets (e.g., online content) at user devices. The media assets may include webinars, such as web-based presentations, livestreams, webcasts, etc., that include elements of video content, audio content, and/or supplemental content (e.g., slideshows, polls, etc.).

In one example, a plurality of users may collaborate via a plurality of user devices to create a media asset, such as a webinar. The plurality of users may interact via studio module of a client application as described herein to record, generate, and/or edit content for the media asset. A first user device of the plurality of user devices may be associated with a first user (e.g., a presenter of the media asset/webinar). The first user may generate first content for the media asset. The first user device may send the first content to a computing device in communication with the plurality of user devices, such as a conference server(s). The computing device may determine a first plurality of content elements associated with the first content, such as a first identifier, a first beginning timestamp, a first ending timestamp, an identifier for the media asset, a first identifier for the first content, a session identifier associated with the plurality of user devices, a combination thereof, and/or the like. As another example, the first plurality of content elements may comprise one or more portions of the first content itself. The first plurality of content elements may be sent by the computing device to one or more content servers. The one or more content servers may receive the first plurality of content elements and store the same in a database.

A second user device of the plurality of user devices may be associated with a second user (e.g., a presenter of the media asset/webinar). The second user may generate second content for the media asset. The second content may comprise recorded audio, video, or a combination thereof. The second user device may send the second content to the computing device, which may determine a second plurality of content elements associated with the second content. The second plurality of content elements may be sent by the computing device to the one or more content servers, which may receive the second plurality of content elements and store the same in a database.

The computing device may send the second plurality of content elements and/or an indication thereof to the first user device. The first user device may generate a user interface of a production environment configured for editing the media asset. The production environment may allow the plurality of users to collaborate via the plurality of user devices to create, revise, edit, etc., the media asset. The production environment may comprise one or more elements of a studio module as described herein.

The first user may interact with the production environment to edit, revise, etc., the first content or the second content. For example, a first object associated with the first content and a second object associated with the second content (e.g., waveforms of audio) may be generated at an editing element within the production environment. The first user, via the first user device, may generate at least one user interaction via the editing element with the first content or the second content by interacting with the first object or the second object (e.g., by interacting with the waveforms of audio). The editing element may comprise a toolbar comprising a plurality of editing tools (e.g., copying/cutting/pasting tools, zoom tools, playing operations (FF, RWD, pause), etc.). The at least one user interaction may comprise use of a zoom function, an application of one or more filters, (e.g., a fade-out filter applied to a waveform of audio), an adjustment of a level of gain associated with the first object or the second object, and/or manipulation/dragging the first object or the second object along a timeline corresponding to the media asset. Other examples are possible as well.

The first user device may send an indication of the at least one user interaction to the computing device. The indication of the at least one user interaction may comprise one or more of the first plurality of content elements or the second plurality of content elements (e.g., based on the type of interaction/what was edited by the first user). The indication of the at least one user interaction may cause the computing device to synchronize the first content and the second content within the media asset. For example, the computing device may synchronize the first content and the second content within the media asset based on: the at least one user interaction, the first plurality of content elements, and/or the second plurality of content elements. The computing device may send the indication of the at least one user interaction (e.g., metadata) to the one or more content servers. The one or more content servers may store the indication of the at least one user interaction (e.g., the metadata) at one of the databases. In this way, any editing/revision/content generation performed at any one of the plurality of user devices may be synchronized in real-time.

FIG. 1 illustrates an example of an operational environment 100 that includes a presentation platform for presentation of digital content, in accordance with one or more embodiments of this disclosure. The presentation platform can include backend platform devices 130 and, in some cases, distribution platform devices 160. In other cases, the distribution platform devices 160 can pertain to a third-party provider. Regardless of its type, the backend platform devices 130 and the distribution platform devices 160 can be functionally coupled by a network architecture 155. The network architecture 155 can include one or a combination of networks (wireless or wireline) that permit one-way and/or two-way communication of data and/or signaling. The digital content can include, for example, 2D content, 3D content, or 4D content or another type of immersive content. Besides digital content that is static and, thus, can be consumed in time-shifted fashion, digital content that can be created and consumed contemporaneously also is contemplated.

The digital content can be consumed by a user device of a group of user devices 102. The user device can consume the content as part of a presentation that is individual or as part of a presentation involving multiple parties. Regardless of its type a presentation can take place within a session to consume content. Such a session can include, for example, a call session, videoconference, a downstream lecture (a seminar, a class, a tutorial, or the like, for example).

The group of user devices 102 can include various types of user devices, each having a particular amount of computing resources (e.g., processing resources, memory resources, networking resources, and I/O elements) to consume digital content via a presentation. In some cases, the group of user devices 102 can be homogeneous, including devices of a particular type, such as high-end to medium-end mobile devices, IoT devices 120, or wearable devices 122. A mobile device can be embodied in, for example, a handheld portable device 112 (e.g., a smartphone, a tablet, or a gaming console); a non-handheld portable device 118 (e.g., a laptop); a tethered device 116 (such as a personal computer); or an automobile 114 having an in-car infotainment system (IVS) having wireless connectivity. A wearable device can be embodied in goggles (such as augmented-reality (AR) goggles) or a helmet mounted display device, for example. An IoT device can include an appliance having wireline connectivity and/or wireless connectivity. In other cases, the group of user device 102 can be heterogeneous, including devices of a various types, such as a combination of high-end to medium-end mobile devices, wearable devices, and IoT devices.

To consume digital content, a user device of the group of user devices 102 can execute a client application 106 retained in a memory device 104 that can be present in the user device. A processor (not depicted in FIG. 1) integrated into the user device can execute the application 106. The client application 106 can include a mobile application or a web browser, for example. Execution of the client application 106 can cause initiation of a presentation session. Accordingly, execution of the client application 106 can result in the exchange of data and/or signaling with a user gateway 132 included in the backend platform devices 130. The user device and the user gateways 132 can be functionally coupled by a network architecture 125 that can include one or a combination of networks (wireless or wireline) that permit one-way and/or two-way communication of data and/or signaling. Specifically, the user device can receive data defining the digital content. Such data can be embodied in one or multiple streams defining respective elements of the digital content. For instance, a first stream can define imaging data corresponding to video content, and a second stream can defined audio data corresponding to an audio channel of the digital content. In some cases, a third stream defining haptic data also can be received. The haptic data can dictate elements of 4D content or another type of immersive content.

The user gateway 132 can provide data defining the digital content by identifying a particular deliver server of multiple delivery servers 162 included in the distribution platform devices 160, and then supplying a request for content to that particular delivery server. That particular delivery server can be embodied in an edge server in cases in which the distributed platform devices 160 include a content delivery network (CDN). In some configurations, the particular delivery server can have a local instance of digital content to be provided to a user device. The local instance of digital content can be obtained from one or several media repositories 164, where each one of the media repositories 164 contain media assets 166. Such assets can be static and can be consumed in time-shifted fashion. At least some of the media assets 166 can be specific to a media repository or can be replicated across two or more media repositories. The media assets 166 can include, for example, a video segment, a web cast, an RSS feed, or another type of digital content that can be streamed by the user gateway 132 and/or other devices of the backend platform devices 130. The media assets 166 are not limited to digital content that can be streamed. In some cases, at least some of the media assets 166 can include static digital content, such as an image or a document.

The particular delivery server can provide digital content to the user gateway 132 in response to the request for content. The user gateway 132 can then send the digital content to a user device. The user gateway 132 can send the digital content according to one of several communication protocols (e.g., IPv4 or IPv6, for example).

In some embodiments, the digital content that is available to a user device or set of multiple user devices (e.g., a virtual classroom or a recital) can be configured by content management subsystem 140. To that end, the content management subsystem 140 can identify corpora of digital content applicable to the user device(s). Execution of the client application 106 can result in access to a specific corpus of digital content based on attributes of the user device or a combination of the set of multiple devices.

The subsystems 136 also include an analytics subsystem 142 that can generate intelligence and/or knowledge about content consumption behavior of a user device (e.g., one of the user devices 102). The analytics subsystem 142 can retain the intelligence and/or knowledge in a storage subsystem 144. Both the intelligence and knowledge can be generated using historical data identifying one or different types of activities of the user device. The activities can be related to consumption of digital content. In some configurations, the client application 106 can send activity data during consumption of digital content. The activity data can identify an interaction or a combination of interactions of the user device with the digital content. An example of an interaction is trick play (e.g., fast-forward or rewind) of the digital content. Another example of an interaction is reiterated playback of the digital content. Another example of an interaction is aborted playback, e.g., playback that is terminated before the endpoint of the digital content. Yet another example of the interaction is submission (or "share") of the digital content to a user account in a social media platform. Thus, the activity data can characterize engagement with the digital content.

The analytics subsystem 142 can then utilize the activity data to assess a degree of interest of the user device on the digital content (e.g., media assets). To that end, in some embodiments, the analytics subsystem 142 can train a classification model to discern a degree of interest on digital content among multiple interest levels. The classification model can be trained using unsupervised training, for example, and multiple features determined using digital content and the activity data. By applying the trained classification model to new activity data, an interest attribute can be generated. An interest attribute may represent one of the multiple interest levels and, thus, quantifies interest on the digital content on part of the user device.

By evaluating interest of a user device on different types of digital content, the analytics subsystem 142 can generate a user profile for the user device. Such an evaluation can be implemented for multiple user devices and therefore multiple user profiles can be generated. A user profile may comprise a user interest cloud (UIC). A UIC can identify types of digital content—and/or features thereof—likely to be of interest to a user corresponding to a UIC and therefore likely to be consumed by the user via their user device. For example, a UIC may comprise a tag cloud that includes interest tags, which correspond to respective interests of a user. An interest of a user may be derived from user activity data. For example, the analytics subsystem 142 may receive activity data indicative of a plurality of engagements of a user device with a plurality of media assets (e.g., digital content). The analytics subsystem 142 may receive the activity data via the client application 106 executing on the user device. Each of the plurality of media assets may comprise a plurality of content features, as further described herein. The analytics subsystem 142 may generate a UIC associated with that particular user and/or user device. The UIC may include at least one content feature of the plurality of content features (e.g., representing content features associated with content with which the user has engaged). The UIC may also include, as further described herein, at least one interest attribute representing a level of interest for each of the media assets consumed by the user/user device. As further described herein, the UIC can be used by a classification model to identify one or more of the media assets 166 that are likely to be of interest to a user corresponding to the UIC.

Figure 2:
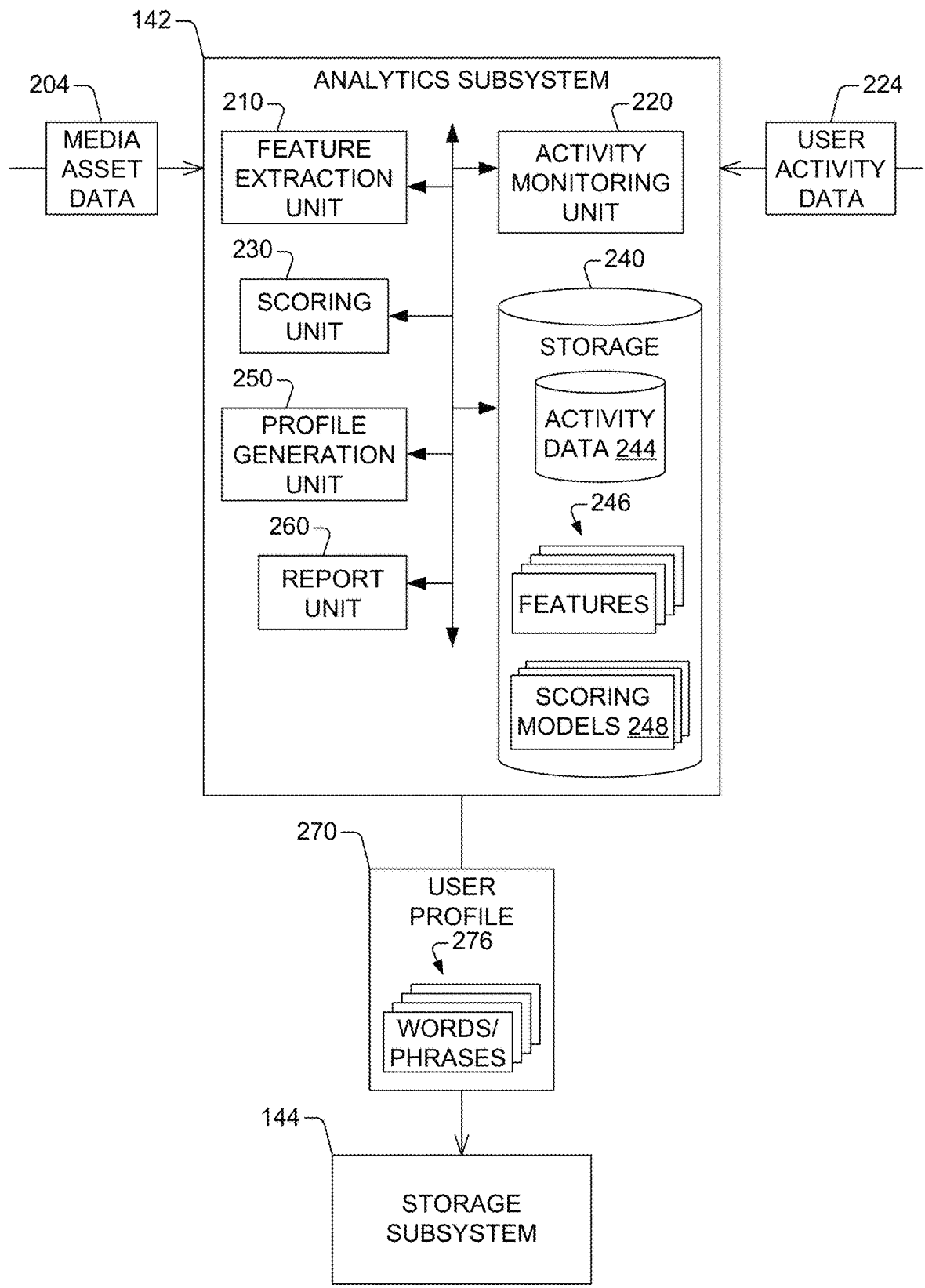
FIG. 2 illustrates an example of an analytics subsystem included in a presentation platform for presentation of digital content, in accordance with one or more embodiments of this disclosure.

As shown in FIG. 2, the analytics subsystem 142 can include multiple units that permit generating a user profile. The analytics subsystem 142 can include a feature extraction unit 210 that can receive media asset data 204 defining a media asset of the media assets 166 (FIG. 1). As mentioned, the media asset can be a webinar, a video, a document, a webpage, a promotional webpage, or similar asset. The feature extraction unit 210 can then determine one or several content features for the media asset. Examples of content features that can be determined for the media asset include, content type (video, webinar, pdf, web page, etc.), content rating; author information (e.g., academic biography of a lecturer); date of creation; content tag; content category; content filter; language of the content; content description Simply as an example, the content description can include an abstract or a summary, such as a promotional summary, a social media summary, and an on-demand summary. The feature extraction unit 210 can determine the content feature(s) for the media asset prior to consumption of the media asset. In this way, the determination of a user profile can be more efficient. The feature extraction unit 210 can retain data indicative of the determined content feature(s) in storage 240, within memory elements 246 (represented features 246).

In addition, the analytics subsystem 142 can include an activity monitoring unit 220 that can receive user activity data 224 for a user device. As mentioned, the client application 106 (FIG. 1) includes in the user device can send the user activity data 224. The user activity data 224 can identify an interaction or a combination of interactions of the user device with the media asset. Again, an interaction can include one of trick play, reiterated playback, aborted play, social media share, or similar. The activity monitoring unit 220 can then generate one or several engagement features using the user activity data 224. In some configurations, an engagement feature can quantify the engagement of the user device with the media asset. For instance, the engagement feature can be a numerical weight ascribed to a particular type of user activity data 224. For example, aborted playback can be ascribed a first numerical weight and social media share can be ascribed a second numerical weight, where the first numerical weight is less than the second numerical weight. Other numerical weights can be ascribed to reiterated playback and trick-play. For such interactions, the number of reiterations and the time spent consuming the media asset due to trick-play can determine the magnitude of respective numerical weights. The feature extraction unit 210 can retain data indicative of the determined engagement feature(s) in the storage 240, within the features 244.

The analytics subsystem 142 also can include a scoring unit 230 that can determine an interest level for the media asset corresponding to the determined content feature(s) and engagement feature(s). To that end, the scoring unit can apply a scoring model 248 to those features, where the scoring model 248 can be a trained classification model that resolves a multi-class classification task. Specifically, in some embodiments, the scoring unit 230 can generate a feature vector including determined content feature(s) and engagement feature(s) for the media asset. A feature vector may be associated with a particular user device(s). A feature vector may comprise a quantification of a level/amount of engagement with each media asset and/or a numerical weight associated with an engagement feature as described herein. The number and arrangement of items in such a feature vector may be the same as those of features vectors used during training of the scoring model 248. The scoring unit 230 can then apply the scoring model 248 to the feature vector to generate an interest attribute representing a level of interest on the media asset. The interest attribute can be a numerical value (e.g., an integer number) or textual label that indicates the level of interest (e.g., "high," "moderate," "low").

A profile generation unit 250 can determine, in some instances, that an interest attribute for a media asset meets or exceeds a defined level of interest. In those instances, the profile generation unit 250 can select words or phrases, or both, from content features determined for the media asset. Simply for purposes of illustrations, the profile generation unit 250 can select one or more categories of the media asset and a title of the media asset as is defined within a description of the media asset. A selected word or phrase may, for example, represent an interest of the user device on the media asset. The profile generation unit 250 can then generate a user profile 270 that includes multiple entries 276, each one corresponding to a selected word or phrase. The profile generation unit 250 can then retain the user profile 270 in the storage subsystem 144.

Figure 3A:
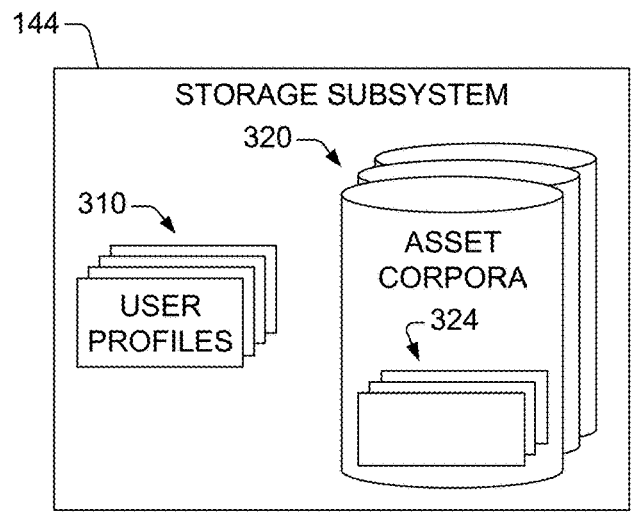
FIG. 3A illustrates an example of a storage subsystem included in a presentation platform for presentation of digital content, in accordance with one or more embodiments of this disclosure.

By receiving user activity data 224 from different user devices, the analytics subsystem 142 can generate respective user profiles for those user devices. Thus, as is illustrated in FIG. 3A, the storage subsystem 144 can include user profiles 310. In addition, or in some embodiments, the content management subsystem 140 (FIG. 1) can then configure digital content (e.g., media assets) that are of interest to the user device. As a result, a particular group of the media assets 166 can be made available to a particular user device. Such a group may define a corpus of digital content.

In some embodiments, a user profile and a corpus of digital content for a user device also can comprise a UIC for the user device. In addition, or in other embodiments, the content management subsystem 140 can configure one or more functions to interact with digital content. Those function(s) can include, for example, one or a combination of translation functionality (automated or otherwise), social-media distribution, formatting functionality, or the like. The content management subsystem 140 can include at least one of the function(s) in the user interest cloud.

The content management subsystem 140 can retain data defining a UIC within the storage subsystem 144. Accordingly, the storage subsystem 144 can include asset corpora 320 (FIG. 3A) that retains a corpora of media assets 324 for respective user profiles 310. Multiple memory devices can comprise the asset corpora 320. Those memory devices can be distributed geographically, in some embodiments. One or many database management servers (not depicted in FIG. 3A) can manage the cloud storage 320. The database management server(s) can be included in the content management subsystem 140 (FIG. 1).

At least a subset of the user profiles 320 can correspond to respective ones of the interest cumuli 314. In other words, a first user profile of the user profiles 320 can be logically associated with a first interest cumulus of the interest cumuli 314, a second user profile can be logically associated with a second interest cumulus of the interest cumuli 316, and so forth. A logical association can be provided by a unique identifier (ID) for an interest cumulus corresponding to a user profile. The unique ID can be retained in the user profile.

As described herein, each UIC may be derived from user activity data 224 indicative of a plurality of engagements of a user device with a plurality of media assets (e.g., digital content). The analytics subsystem 142 may receive the activity data via the client application 106 executing on the user device. The analytics subsystem 142 may generate a UIC associated with that particular user and/or user device. The UIC may include at least one content feature of a plurality of content features (e.g., representing content features associated with content with which the user has engaged). The UIC may also include, as further described herein, at least one interest attribute representing a level of interest for each of the media assets consumed by the user/user device. Each of the plurality of media assets 166 may comprise a plurality of content features including, but not limited to, at least one of: content format/type (e.g., video, audio, webcast, webinar, PDF, webpage, etc.); content rating (e.g., an audience/aggregated review score, such as 4/5 stars, 88%, etc.); demographic information associated with presenters; date of creation/upload/availability; engagement score of other users (e.g., as described herein with reference to FIG. 5); metadata (e.g., tags, categories, filters, etc.); description/abstract/summary; language(s) spoken/shown; functionality feature(s), as further described herein; a combination thereof, and/or the like.

Figure 3B:
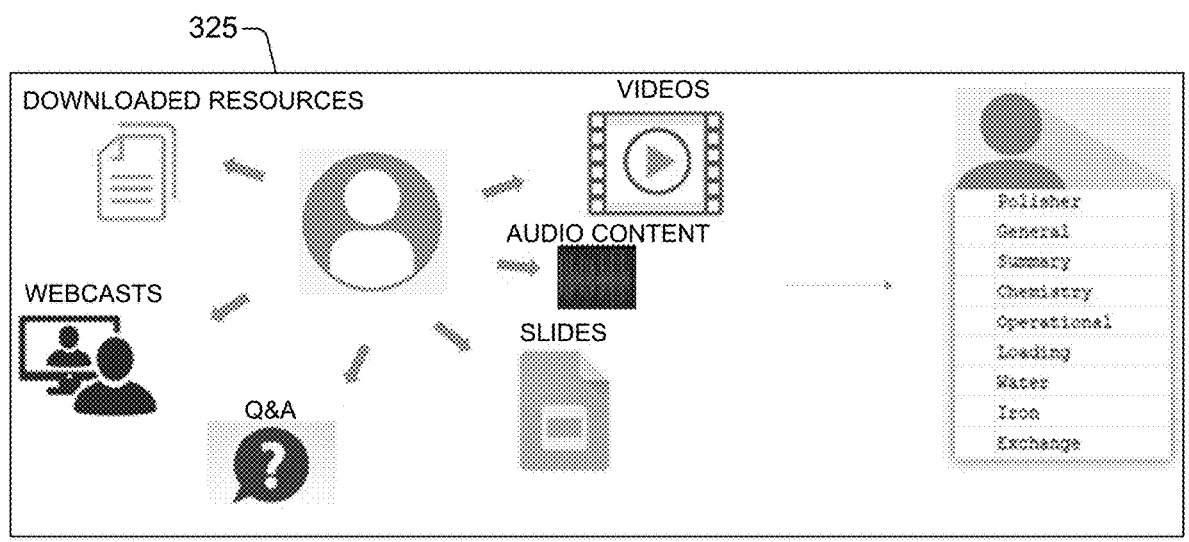
FIG. 3B illustrates an example visual representation of a user interest cloud, in accordance with one or more embodiments of this disclosure.

FIG. 3B shows an example visual representation 325 of a UIC. As shown in the visual representation 325, the UIC may be based on, for example, the user activity data 224 indicative of the plurality of engagements with one or more of the plurality of media assets. The media assets may include, as an example only, downloaded resources (e.g., media assets and related content); videos; audio content (podcasts, etc.); webcasts/webinars; questions asked (e.g., via the client application 106); and slides. As further described herein, a user profile, which may comprise the UIC, may include multiple entries 276 of words and/or phrases. An example of words and/or phrases that may be included in the multiple entries 276 is shown in the right-hand side of the visual representation 325 of the UIC. These words and/or phrases may represent interests of the corresponding user that are derived as described herein based on the user activity data 224.

Returning to FIG. 1, multiple source devices 150 can create digital content for presentation at a user device (e.g., one of the user devices 102). At least a subset of the source devices 150 can comprise a source platform. Such digital content can include, for example, static assets that can be retained in a media repository, as part of the media assets 166. The source device can provide the created digital content to a source gateway 146. The source device can be coupled to the source gateway by a network architecture 145. The network architecture 145 can include one or a combination of networks (wireless or wireline) that permit one-way and/or two-way communication of data and/or signaling. The source gateway 140 can send the digital content to the content management subsystem 140 for provisioning of the digital content in one or several of the media repositories 164.

In addition, or in some cases, a source device can configure the manner of creating digital content contemporaneously by means of the client application 106 and other components available to a user device. That is, the source device can build the client application 106 to have specific functionality for generation of digital content. The source device can then supply an executable version of the client device to a user device. Digital content created contemporaneously can be retained in the storage subsystem 144, for example.

The subsystems 136 also can include a service management subsystem 138 than can provide several administrative functionalities. For instance, the service management subsystem 138 can provide onboarding for new service providers. The service management subsystem 138 also can provide billing functionality for extant service providers. Further, the service management subsystem can host an executable version of the client application 106 for provision to a user device. In other words, the service management subsystem 136 can permit downloading the executable version of the client application 106.

With further reference to FIG. 2, the analytics subsystem 142 can retain user activity data 224 over time in an activity data repository 244 (referred to as activity data 244). The time during which the user activity data 224 can be retained can vary, ranging from a few days to several weeks.

The analytics subsystem 142 can include a report unit 260 that can generate various views of the activity data 244 and can operate on at least a subset of the activity data 244. The report unit 260 also can cause a user device to present a data view and/or one or several results from respective operations on the activity data 244. To that end, the user device can include the application 106 and the report unit 260 can receive from the application 106 a request message to provide the data view or the result(s), or both. Further, in response to the request message, the report unit 260 generate the data view and the result(s) and can then cause the application 106 to direct the user device to present a user interface conveying the data view or the result(s). The UI can be presented in a display device integrated into, or functionally coupled to, the user device. The user device can be one of the user devices 102 (FIG. 1).

The request message can be formatted according to one of several communication protocols (e.g., HTTP) and can control the number and type of data views and results to be presented in the user device. The request message can thus include payload data identifying a data view and/or a result being requested. In some cases, the request message can be general, where the payload data identify data view(s) and result(s) defined by the analytics subsystem. For instance, the payload data can be a string, such as "report_all" or "dashboard," or another alphanumeric code that conveys that a preset reporting option is being requested. In other cases, the request message can be customized, where the payload data can include one or more first codes identifying respective data views and/or one or more second codes identifying a particular operation on available activity data 244.

Figure 4:
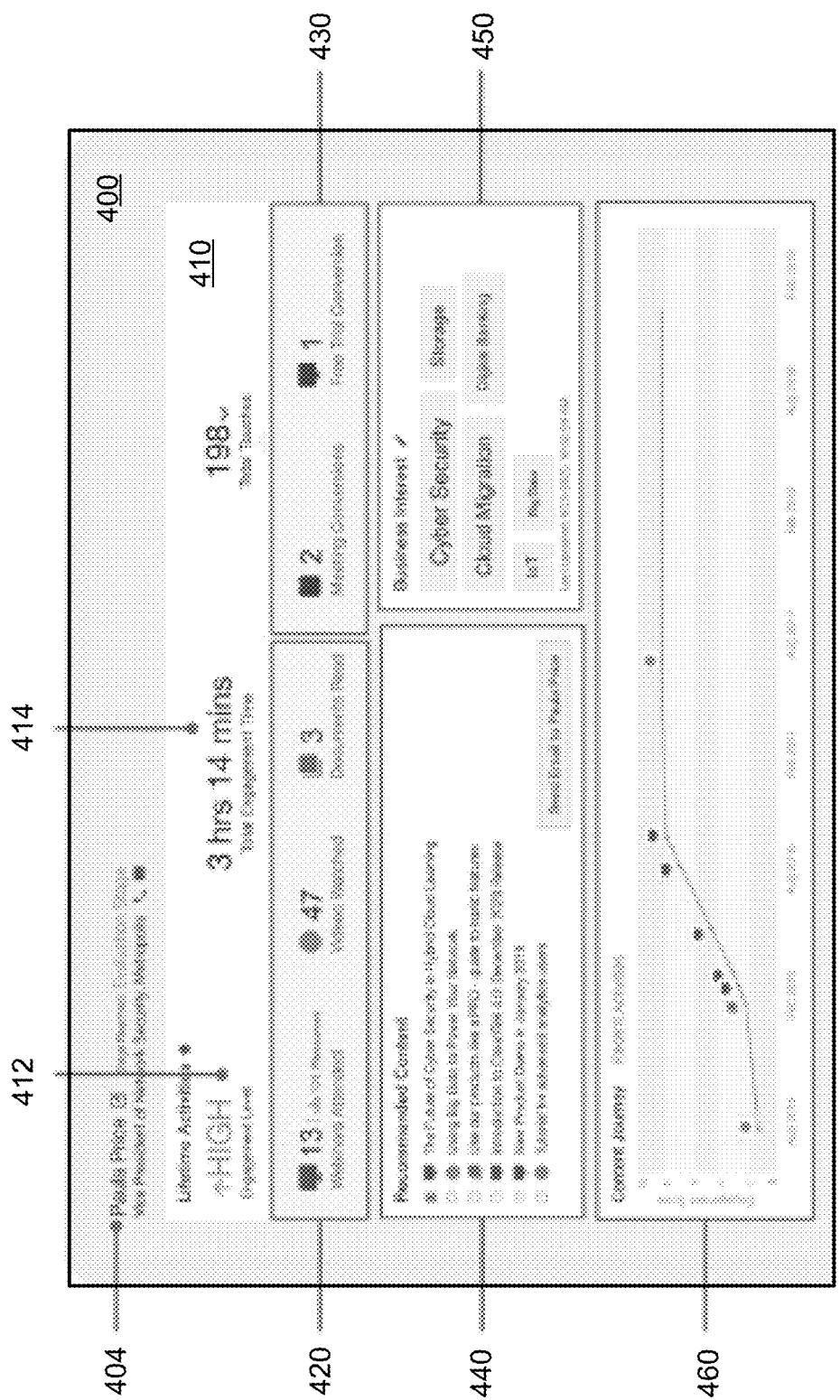
FIG. 4 illustrates an example of a user interface (UI) that presents various types of engagement data for a user device, in accordance with one or more embodiments of this disclosure.

FIG. 4 illustrates an example of a UI 400 that presents various types of engagement data that can be obtained from the activity data 244 for a particular end-user, in accordance with one or more embodiments of this disclosure. The UI 400 can be referred to as engagement dashboard. The data conveyed in the UI 400 can be obtained in response to a request message including the "dashboard" code or a similar payload data. As is illustrated in FIG. 4, the UI 400 includes indicia 404 identifying an end-user various panes, each presenting a particular data view or an aggregated result. Specifically, the UI 400 includes a first pane 410 that presents engagement level 412 and engagement time 414. The UI 400 also includes a second pane 420 that presents engagement activity and a third pane 430 that presents buying activity. In addition.

UI 400 includes a fourth pane 440 that presents a menu of content recommendations and a fifth pane 450 that presents at least some of the words/phrases 276 (FIG. 2) pertaining to the end-user. The words and phrases that are presented can be formatted in a way that pictorially ranks the interests of the end-user—e.g., greater font size represents greater interest. Further, the UI 400 also includes a sixth pane 460 that presents an amount of content consumed as a function of time. Such temporal dependence of content consumption can be referred to as "content journey." By making available the types of engagement data illustrated in the UI 400, a source device can access valuable and actionable insights to optimize a digital experience (or media asset).

The analytics subsystem 142 (FIG. 2) also can contain other scoring models besides the scoring model that can be applied to generate an interest level for particular content (e.g., a media asset). By using those other scoring models, the analytics subsystem 142 can generate information identifying features of a digital experience (or media asset(s)) that may cause satisfactory engagement (e.g., most engagement, second most engagement, or similar) with an end-user. Accordingly, the analytics subsystem 142 can predict how best to personalize digital experiences (or media assets) for particular customers based on their prior behavior and interactions with media assets supplied by the distribution platform devices 160 (FIG. 1). Accordingly, a source device can access valuable and actionable insights to optimize a digital experience.

More specifically, in some embodiments, the scoring unit 230 (FIG. 2) can apply a defined scoring model to user activity data 224 to evaluate a set of functionality features present in several media assets. Evaluating a functionality feature f includes generating a score S for f. Thus, for a set of multiple functionality features $\{f_0, f_1, f_2, \ldots f_{N-1}\}$, with N a natural number greater than unity, application of defined scoring model can result in a set of respective scores $\{S_0, S_1, S_2, \ldots, S_{N-1}\}$. The defined scoring model can be one of the scoring models 248 and can be trained using historical user activity data for many users and media assets.

Simply for purposes of illustration, the functionality features can include (i) real-time translation, (ii) real-time transcription (e.g., captioning) in same language; (iii) real-time transcription in a different language; (iv) access to documents (scientific publications, scientific preprints, or whitepapers, for example) mentioned in a presentation; (v) detection of haptic capable device and provisioning of 4D experience during presentation; (vi) "share" function to custom set of recipients within or outside a social network; (vii) access to recommended content, such as copies of or links to similar presentations and/or links to curated content (e.g., "because you watched "Content A" you might enjoy "Content B"); (viii) messaging with links to cited, recommended, or curated content; (ix) scheduler function that prompts to add, adds, or sends invites for, live presentations of interest that occur during times that end-user is free; automatically populates a portion of the calendar with those presentations, amount of calendar that can be populated is determined by end-user; or similar functions. Access to a document can include provision of a copy of the document or provision of a link to the document. Similarly, access to content can include provision of a copy of the content or provision of a link to the content.

Figure 5:
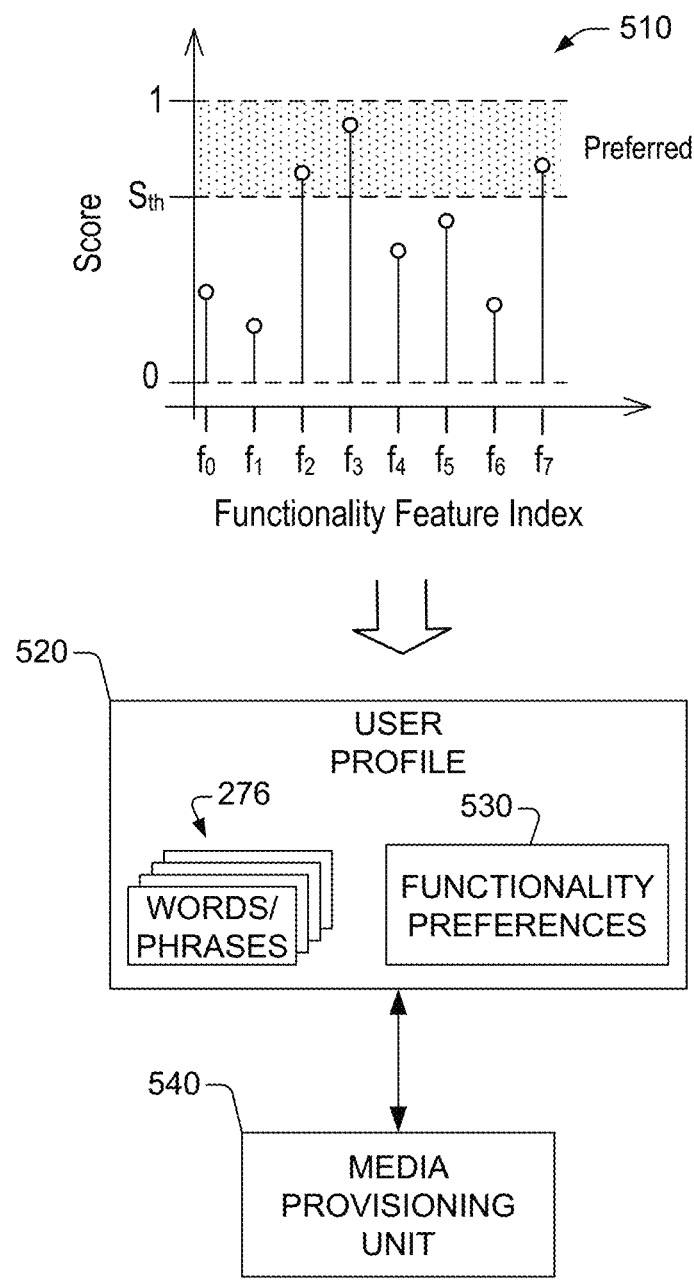
FIG. 5 schematically depicts engagement scores for example functionality features available per digital experience (or media asset), for a particular end-user, in accordance with one or more embodiments of this disclosure.

Diagram 510 in FIG. 5 schematically depicts engagement scores for an example case in which N=8 functionality features are available per digital experience (or media asset), for a particular end-user. Each of the features $f_0, f_1, f_2, f_3, f_4, f_5, f_6$, and $f_7$ have respective scores. Some of the scores are less than a threshold score $S_{th}$ and other scores are greater than $S_{th}$. The threshold score is a configurable parameter that the profile generation unit 250 (FIG. 2) can apply to determine if a functionality feature is preferred by the particular end-user. As is depicted with a dotted area in FIG. 5, a functionality feature f is preferred if the corresponding engagement score S is greater than or equal to $S_{th}$. The score structure for that set of functionality features can differ from end-user to end-user, thus revealing which functionality features are preferred for the end-user. The profile generation unit 250 can determine that respective engagement scores for one or several functionality features are greater than $S_{th}$. In response, the profile generation unit 250 can update a user profile 520 with preference data identifying the functionality feature(s). Thus, the user profile 520 can include words/phrases 276 and functionality preference 530 including that preference data.

In the example depicted in FIG. 5, functionality features $f_2, f_3$ and $f_7$ have engagement scores greater than $S_{th}$. Thus, the profile generation unit 250 (FIG. 2) can determine that those features are preferred by the particular end-user. In one example, $f_2$ can be real-time translation, $f_3$ can be real-time transcription in a different language from the language of a presentation, and $f_7$ can be access to documents. The profile generation unit 250 can determine that respective engagement scores for those features are greater than $S_th$, and can then update a user profile 520 with preference data identifying features functionality features $f_2, f_3$ and $f_7$. As such, the user profile 520 can include words/phrases 276 and functionality preference 530 including that preference data.

The content management subsystem 140 can personalize the digital experiences for an end-user by including the functionality features 530 defined in the user profile 520 pertaining to the end-user. In some embodiments, the content management subsystem 140 can include a media provisioning unit 540 that access the functionality preferences 530 and can then generate a UI that is personalized according to the functionality preferences 530. That personalized UI can include the functionality features identified in the functionality preferences 530.

In addition, or in other embodiments, the media provisioning unit 540 also can generate a layout of content areas that is personalized to end-user. The personalized layout can include a particular arrangement of one or several UI elements for respective preferred functionalities of the end-user. Further, or in other embodiments, the media provisioning unit 540 can generate a presentation ticker (such as a carousel containing indicia) identifying live-action presentations near a location of a user device presenting the personalized UI. In addition, or in some cases, the presentation ticker also can include indicia identifying digital experiences (or media assets) that occur during times shown as available in a calendar application of the end-user.

It is noted that the analytics subsystem 142 is not limited to scoring models. Indeed, the analytics subsystem 142 can include and utilize other machine-learning (ML) models to provide various types of predictive functionalities. Examples of those functionalities include predictive engagement levels for end-users; Q&A autonomous modules to answer routine support questions; and platform audience and presenter load predictions. The service management subsystem 138 (FIG. 1) can use load predictions to identify and configure operational resources and provide oversight. The operational resources include computing resources, such as processing units, storage units, and cloud services, for example.

Figure 6:
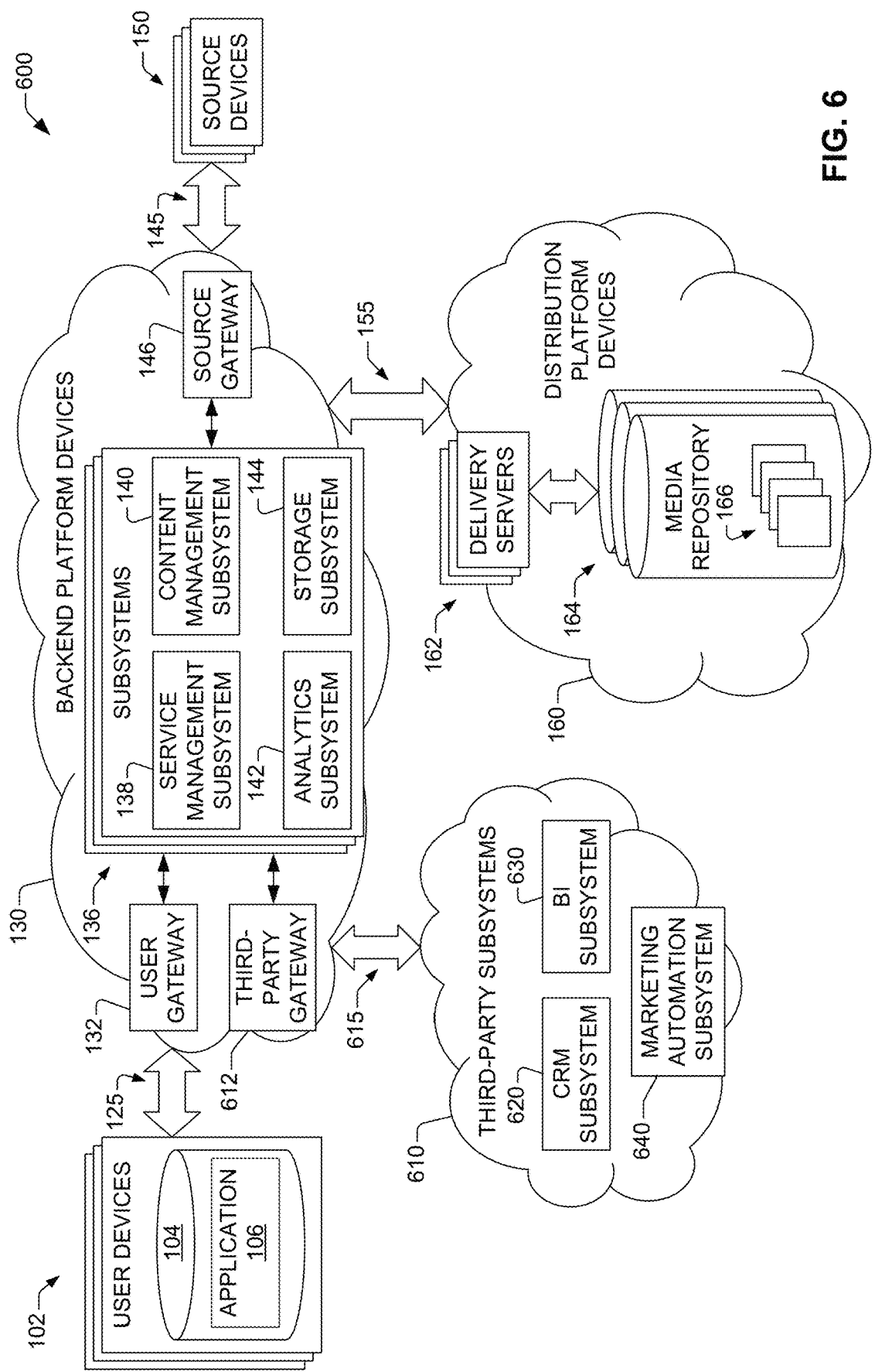
FIG. 6 illustrates an example of an operational environment that includes integration with third-party subsystems, in accordance with one or more embodiments of this disclosure.

The presentation platform described in this disclosure can be integrated with a third-party platform. FIG. 6 illustrates an example of an operational environment 600 that includes a presentation platform integrated with third-party subsystems 610, in accordance with one or more embodiments of this disclosure. Integration of the presentation platform can be accomplished by functional coupling with third-party subsystems 610 via a third-party gateway 612 and a network architecture 615. The network architecture 615 can include one or a combination of networks (wireless or wireline) that permit one-way and/or two-way communication of data and/or signaling.

The third-party subsystem 610 can include various type of subsystems that permit first-person insights generated by the analytics subsystem 142 to be extracted and leveraged across business systems of a source platform. As is illustrated in FIG. 6, the third-party subsystems 610 can include a Customer Relationship Management (CRM) subsystem 620, a business intelligence (BI) subsystem 630, and a marketing automation subsystem 640. Each third-party subsystem 610 may be referred to herein as a "client system" or simply as a "client." The presentation platform described herein may access, control, etc., each of the third-party subsystems 610.

Figure 7A:
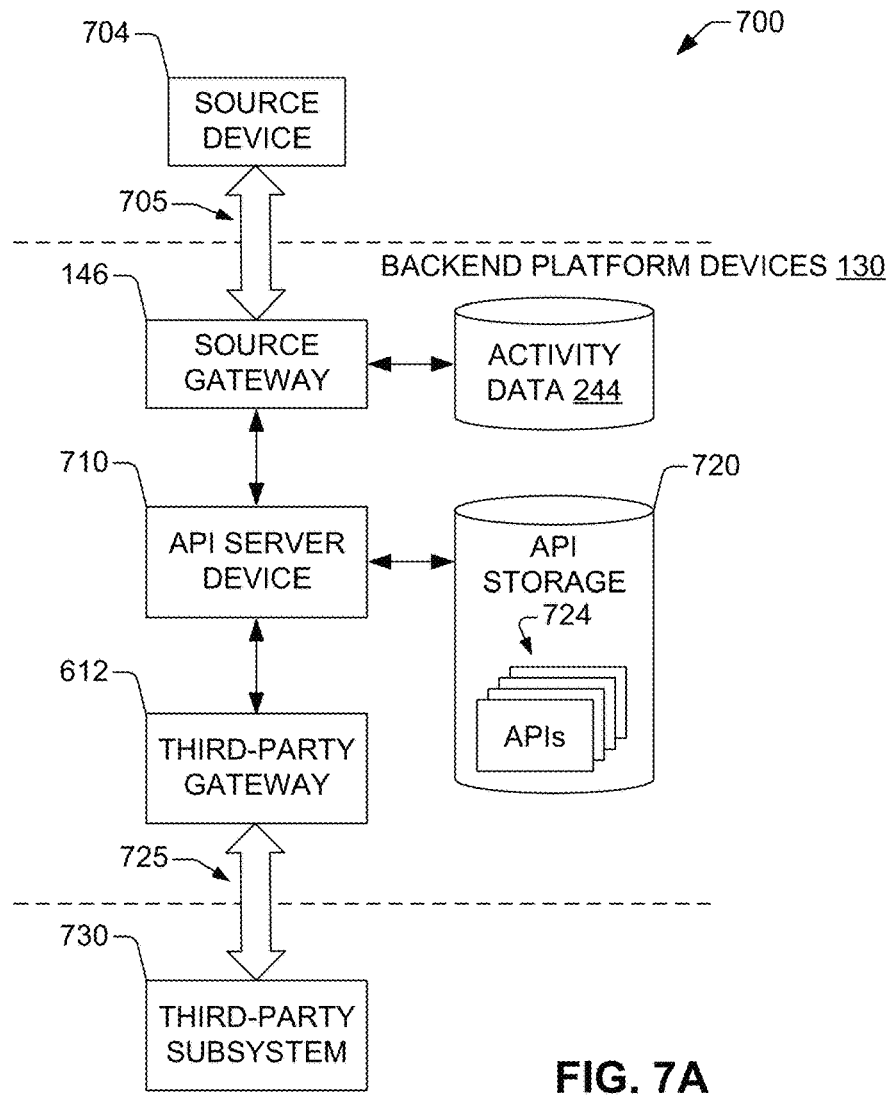
FIG. 7A illustrates another example of an operational environment for integration with a third-party subsystem, in accordance with one or more embodiments of this disclosure.

As is illustrated in FIG. 7, a source device 704 can access an API server device 710 within the backend platform device 130 (FIG. 1 or FIG. 4) by means of the source gateway 146. The API server device 710 can expose multiple application programming interfaces (APIs) 724 retained in API storage 720. One or many of the APIs 724 can be exposed to the source device 704 in order to access a third-party subsystem 730 and functionality provide by such subsystem. The exposed API(s) can permit executing respective sets of function calls. That is, a first exposed API can permit accessing a first group of function calls for defined functionality, and a second exposed API can permit accessing a second group of function calls for defined second functionality. The function calls can operate on data that is contained in the soured device 704 and/or a storage system functionally coupled to the source device 704. The function calls also can operate on activity data 244, with result being pushed to the source device 704.

Data and/or signaling associated with execution of such function calls can be exchanged between the API server device 710 and the third-party subsystem 730 via a third-party gateway 612. In addition, other data and/or signaling can be exchanged between the API server device 710 and the source device 704 via the source gateway 146.

In some cases, the API server device 710 also can expose one or many of the APIs 726 to the third-party subsystem 730. In that way, the third-party subsystem 730 (or, in some cases, a third-party device, such as a developer device) can create applications that utilize some of the functionality of the backend platform devices 130.

Figure 7B:
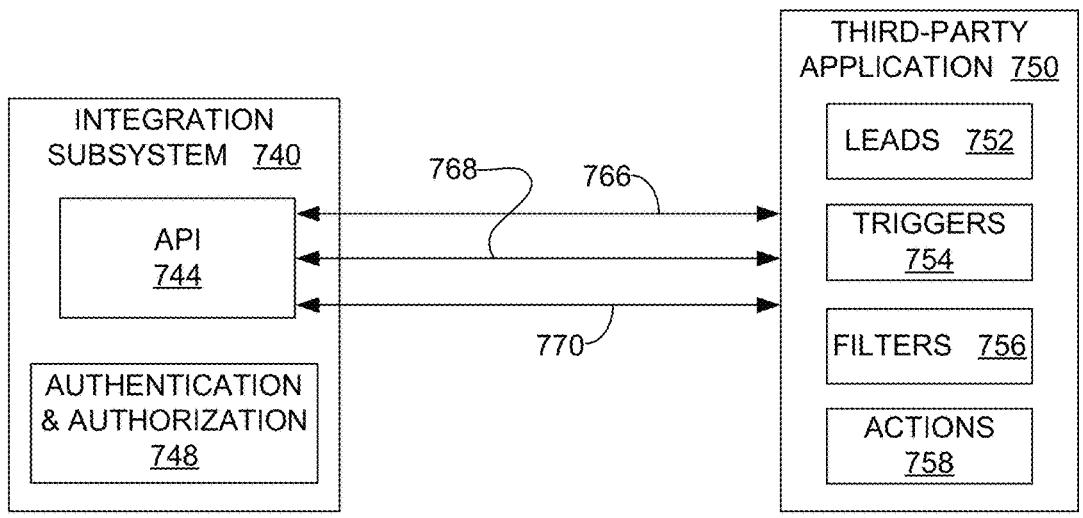
FIG. 7B illustrates example components of an integration subsystem, in accordance with one or more embodiments of this disclosure.

FIG. 7B illustrates example components of the integration subsystem 740. The integration subsystem 740 supports an ecosystem of third-party application integrations and APIs that enable the first-person insights generated by the analytics subsystem 142 to be extracted and leveraged across customer business systems for more intelligent sales and marketing. The integration subsystem 740 can include an API 744 that may be configured to exchange data with one or more third-party applications 750. The one or more third party applications 750 may be, for example, a sales application, a marketing automation application, a CRM application, a Business Intelligence (BI) application, and/or the like. The third-party application 750 may be configured to leverage data received from and/or sent to the integration subsystem 740, via the API 744.

In order to exchange data and provide control over certain functionality via the API 744, the integration subsystem 744 may use an authentication and authorization unit 748 to generate an access token. The access token may comprise a token key and a token secret. The access token may be associated with a client identifier. Authentication for API requests may be handled via custom HTTP request headers corresponding to the token key and the token secret. The client identifier may be included in the path of an API request URL.

The API 744 may comprise a set of routines, protocols, and/or tools for building software applications. The API 744 may specify how software components should interact. In an embodiment, the API 744 may be configured to send data 766, receive data 768, and/or synchronize data 770. In some cases, the API 744 may be configured to send data 766, receive data 768, and/or synchronize data 770 in substantially real-time, at regular intervals, as requested, and/or the like. The API 744 may be configured to provide the one or more third party applications 750 the ability to access a digital experience (or media asset) functionality, including, for example, event management (e.g., create a webinar, delete a webinar), analytics, account level functions (e.g., event, registrants, attendees), event level functions (e.g., metadata, usage, registrants, attendees), and/or registration (e.g., webinar, or an online portal product as is described below).

The integration subsystem 740, via the API 744, may be configured to deliver attendance/registration information to the third party application 750 to update contact information for Leads 752. The third-party application 750 can use attendance/registration information for lead segmentation, lead scoring, lead qualification, and/or targeted campaigns. Engagement data (such as viewing duration, engagement scores, resource downloads, poll/survey responses) associated with webinars may be provided to the third-party application 750 for use in lead scoring and lead qualification to identify leads and ensure effective communication with prospects and current customers.

The integration subsystem 740, via the API 744, may be configured to enable the third-party application 750 to use data provided by the integration subsystem 740, via the API 744, to automate workflows. Engagement data (such as viewing duration, engagement scores, resource downloads, poll/survey responses) associated with webinars may be provided to the third-party application 750 for use in setting one or more triggers 754, filters 756, and/or actions 758. The third-party application 750 may configure a trigger 754. The trigger 754 may be a data point and/or an event, the existence of which may cause an action 758 to occur. The third-party application 750 may configure a filter 754. The filter 754 may be a threshold or similar constraint applied to the data point and/or the event to determine whether any action 758 should be taken based on occurrence of the trigger 758 or determine which action 758 to take based on occurrence of the trigger 756. The third-party application 750 may configure an action 758. The action 758 may be an execution of a function, such as updating a database, sending an email, activating a campaign, etc. The third-party application 750 may receive data (such as engagement data) from the integration subsystem 740, via the API 744, determine if the data relates to a trigger 754, apply any filters 756, and initiate any actions 758. As an example, the third-party application 750 may receive engagement data from the integration subsystem 740 that indicates a user from a specific company watched 30 minutes of a 40 minute video. A trigger 754 may be configured to identify any engagement data associated with the specific company. A filter 756 may be configured to filter out any engagement data associated with viewing times of less than 50% of a video. An action 758 may be configured to send an e-mail to the user inviting the user to watch a related video.

In some embodiments, the content management subsystem 140 (FIG. 1) can provide an online resource portal product that permits providing rich digital experiences for an audience of prospective end-user to find, consume, and engage with interactive webinar experiences and other media assets, such as videos and whitepapers. The online resource portal product can be referred to as an "engagement hub," simply for the sake of nomenclature.

Figure 8:
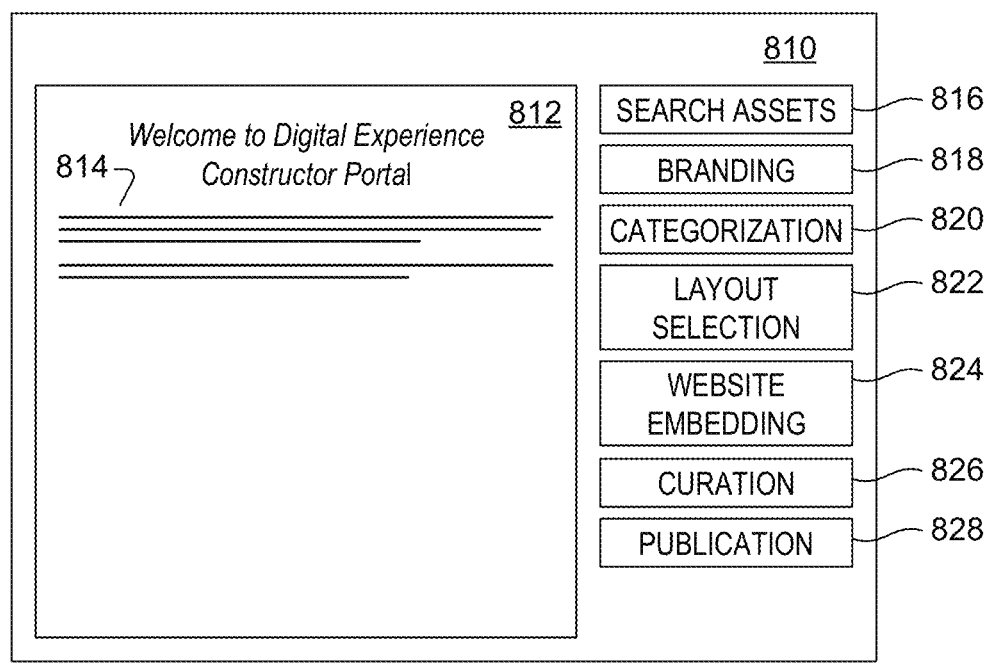
FIG. 8 illustrates an example of a UI representing a landing page for configuration of aspects of a digital experience, in accordance with one or more embodiments of this disclosure.
Figure 9:
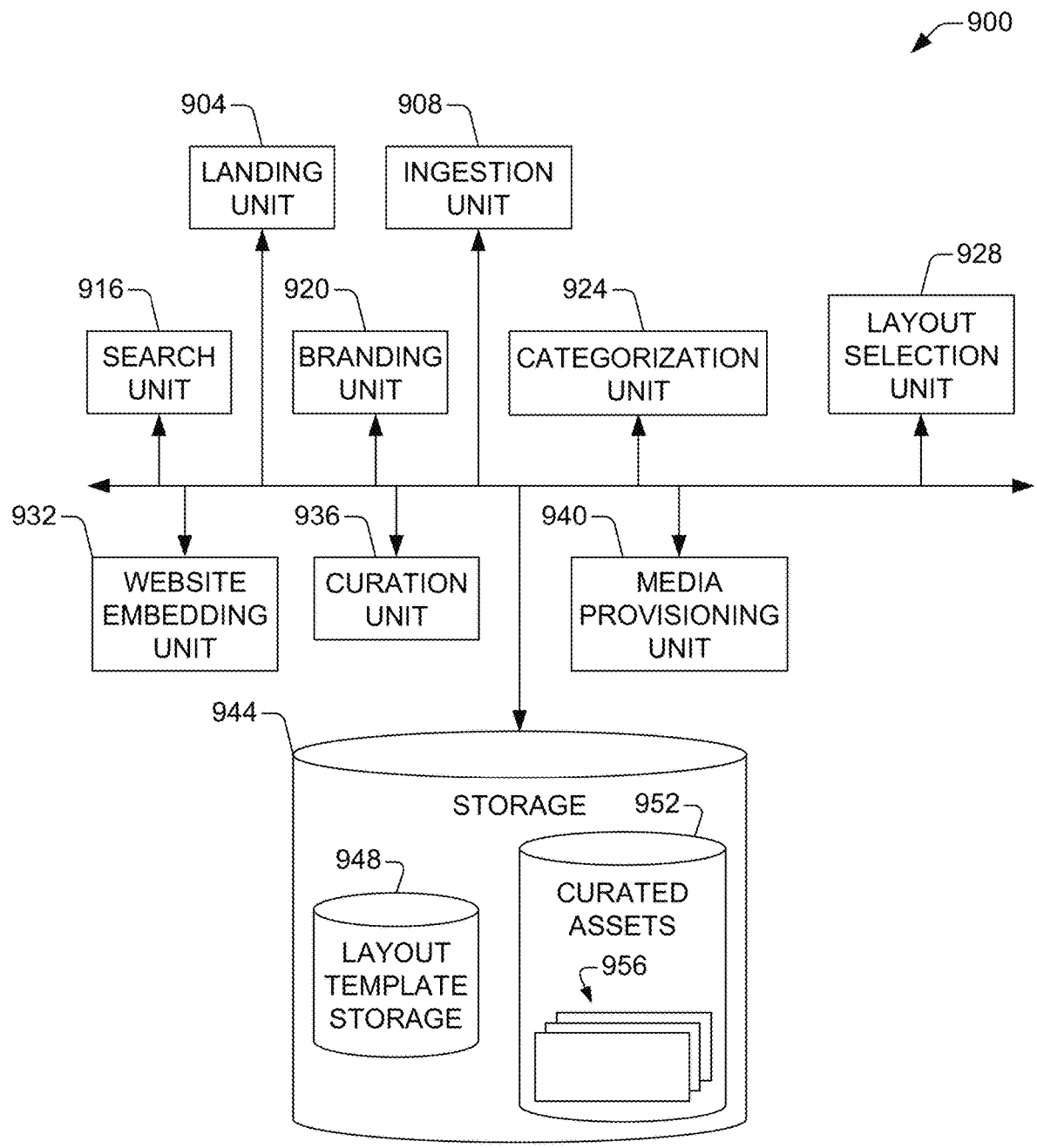
FIG. 9 illustrates an example of a subsystem for configuration of aspects of a digital experience, in accordance with one or more embodiments of this disclosure.

The online portal product provides various functionalities to generate a digital experience (or media asset). As an illustration, FIG. 8 presents an example of a UI 810 representing a landing page of the online portal product, and FIG. 9 illustrates an example of a portal subsystem 900 that provides the functionality of the online portal product. As is illustrated in FIG. 8, the landing page include a pane 812 that includes a title and a UI element 814 that includes digital content describing the functionality of the online portal product. The title is depicted as "Welcome to Digital Experience Constructor Portal," simply as an example. A landing unit 904 in the portal subsystem 900 (FIG. 9) can cause the presentation of the UI 900 in response to receiving a request message to access the online portal product from a source device.

The UI 810 (FIG. 8) also includes several selectable UI elements identifying respective examples of the functionalities that can be provided by the online portal product. Specifically, the selectable UI elements include, for example, a selectable UI element 816 corresponding to a search function; a selectable UI element 818 corresponding to a branding function; a selectable UI element 820 corresponding to a categorization function; a selectable UI element 822 corresponding to a layout selection function (from defined content layouts), a website embedding function, a curation function, and a provisioning function. The provisioning function also can be referred to a publication function.

Selection of the selectable UI element 816 can cause the source device that presents the UI 810 to present another UI (not depicted) to search for a media asset to be augmented with directed content. To that end, in some embodiments, the portal subsystem 900 can include a search unit 916. In this disclosure, directed content refers to digital media configured for a particular audience, or a particular outlet channel (such as a website, a streaming service, or a mobile application), or both. Directed content can include, for example, digital media of various types, such as advertisement; surveys or other types of questionnaires; motion pictures, animations, or other types of video segments; podcasts; audio segments of defined durations (e.g., a portion of a speech or tutorial; and similar media.

Selection of the selectable UI element 818 can cause the source device to present another UI (not depicted) that permits obtaining digital content to incorporate into a particular media asset. The digital content can identify the particular media asset as pertaining to a source platform that includes the source device. In some cases, the digital content can be embodied in as a still image (e.g., a logotype), an audio segment (e.g., a jingle), or an animation. In some embodiments, the portal subsystem 900 can include a branding unit 920 that can direct the source device to present a UI in response to selection of the selectable UI element 818. The portal subsystem 900 also can include an ingestion unit 908 that can obtain the digital content from the storage subsystem 144 (FIG. 1) for example.

Selection of the selectable UI element 820 can cause the source device to present another UI (not depicted) to categorize multiple media assets according to multiple categories. In some embodiments, the portal subsystem 900 can include a categorization unit 924 that can cause presentation of the other UI in response to selection of the selectable UI element 820. The categorization unit 924 also can classify a media asset according to one of the several categories.

Selection of the selectable UI element 822 can cause the source device to present another UI (not depicted) to select a layout of areas for presentation of digital content. A first area of the layout of areas can be assigned for presentation of a media asset that is being augmented with directed content. At least one second area of the layout of areas can be assigned for presentation of the directed content. In some embodiments, the portal subsystem 900 can include a layout selection unit 928 that can cause presentation of the other UI in response to selection of the selectable UI element 822. The layout selection unit 928 can cause presentation of a menu of defined layout templates. Data defining such a menu can be retained in a layout template storage 948. In response to receiving input information identifying a selection of the particular defined layout template, the layout selection unit 928 can configure that particular defined layout for presentation of the media asset and directed content.

Figure 10:
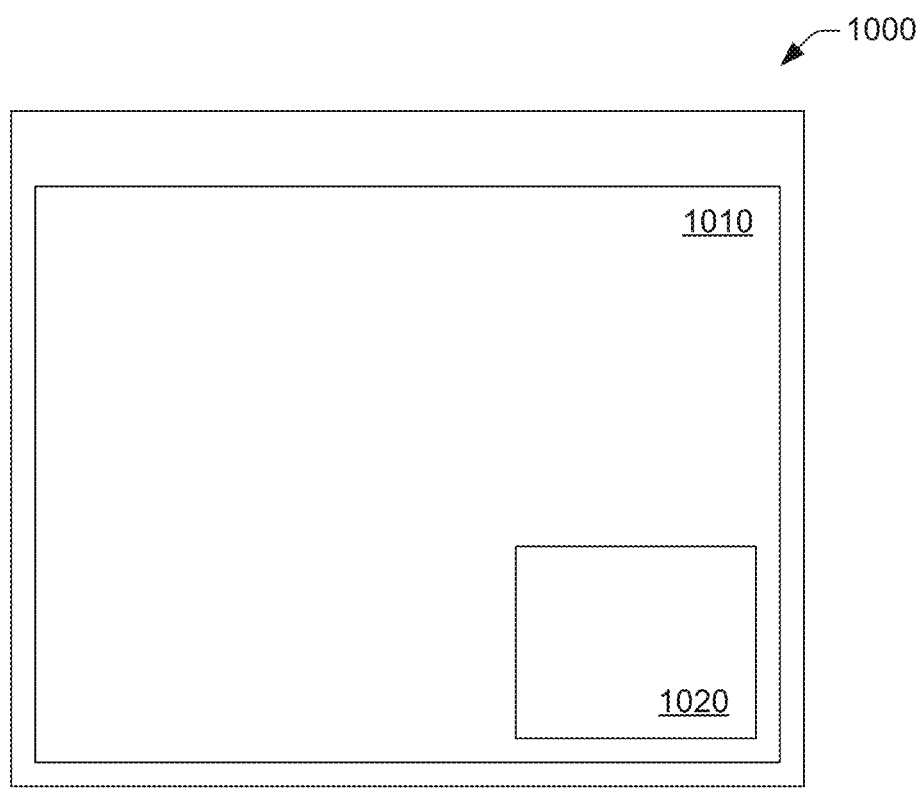
FIG. 10 illustrates a schematic example of a layout template for presentation of a media asset and directed content, in accordance with one or more embodiments of this disclosure.
Figure 11:
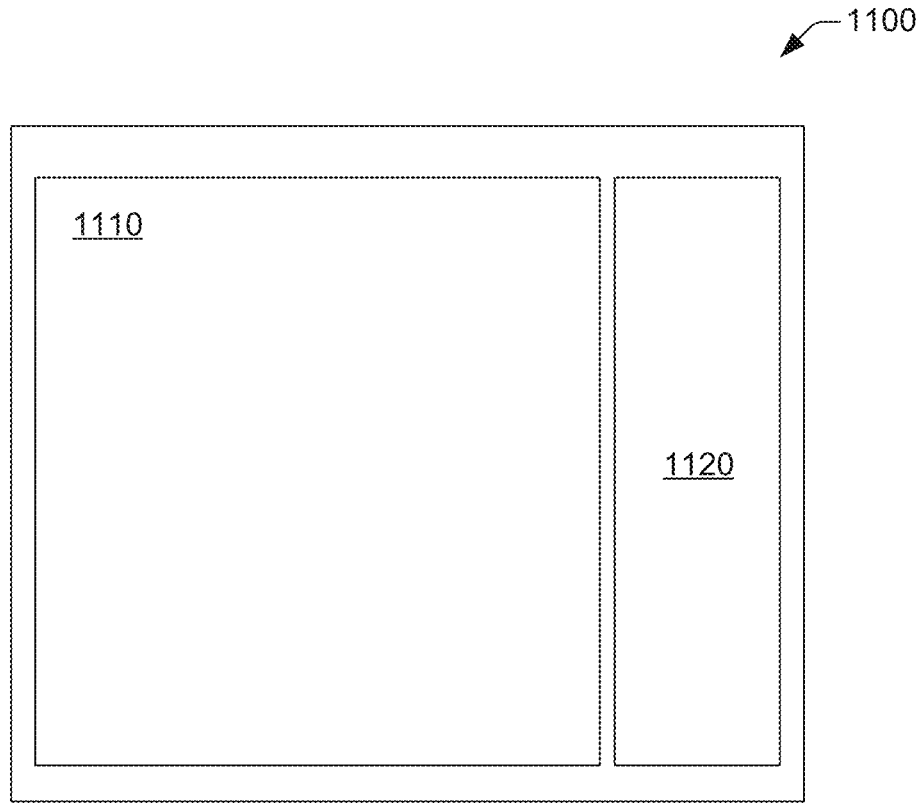
FIG. 11 illustrates another schematic example of a layout template for presentation of a media asset and directed content, in accordance with one or more embodiments of this disclosure.

FIG. 10 and FIG. 11 illustrate respective examples of layout templates. In FIG. 10, an example layout template 1000 includes a first area 1010 that can be allocated to the media asset and a second area 1020 that can be allocated to the directed content. As is shown in FIG. 10, the directed content can be overlaid on the media asset. In FIG. 11, an example layout template 1100 includes a first area 1110 that can be allocated to the media asset and a second area 1120 that can be allocated to the directed content. The second area 1120 is adjacent to first area 1110. Thus, rather than presenting the directed content as an overlay, the directed content is presented adjacent to the media asset.

With further reference to FIG. 8, selection of the selectable UI element 824 can cause the source device that presents the UI 810 to present another UI (not depicted) to configure website-embedding of directed content. To that end, in some embodiments, the portal subsystem 900 can include a website embedding unit 932.

Selection of the selectable UI element 826 can cause the source device to present another UI (not depicted) to curate directed content that can be presented in conjunction with media assets. In some embodiments, the ingestion unit 908 can obtain multiple directed content assets and can cause the source device to present such assets. The multiple directed content assets can be presented in various formats. In one example, the multiple directed content assets can be presented as respective thumbnails. In another example, the multiple directed content assets can be presented in a selectable carousel area. The portal subsystem 900 also can include a curation unit 936 that cause presentation of the other UI in response to selection of the selectable UI element 826. In addition, in some cases, the curation unit 936 can receive input information indicating approval of one or several directed content assets for presentation with media assets. In other cases, the curation unit 936 can evaluate each one the multiple directed content assets obtained by the ingestion component 908. An evaluation that satisfies one or more defined criteria results in the directed content asset being approved for presentation with media assets.

Regardless of approval mechanism, the curation unit 936 can then configure each one of the approved directed content asset(s) as being available for presentation. The approval and configuration represent the curation of those assets. The curation unit 936 can update a corpus of curated directed content assets 956 within a curated asset storage 952 in response to curation of one or many directed content assets.

The portal subsystem 900 also can include a media provisioning unit 940 that can configure presentation of a media asset based on one or a combination of the selected digital content that identifies the source platform, one or several curated directed content assets, and a selected defined layout. To that end, in some cases, the media provisioning unit 940 can generate formatting information identifying the media asset, the selected digital content, the curated directed content asset(s), and the selected defined layout. In addition, or in other cases, the media provisioning unit 940 also can configure a group of rules that controls presentation of directed content during the presentation of the media asset. As an example, the media provisioning unit 940 can define a rule that dictates an instant in which the presentation of the directed content begins and a duration of that presentation. Further, or as another example, the media provisioning unit 940 can configure another rule that dictates a condition for presentation of the directed content and a duration of the presentation of the directed content. Examples of the condition include presence of a defined keyword or keyphrase, or both, in the media asset; presence of defined attributes of an audience consuming the media asset; or similar conditions. An attribute of an audience includes, for example, location of the audience, size of the audience, type of the audience (e.g., students or C-suite executives, for example), or level of engagement of the audience. In some embodiments, an autonomous component (referred to as bot) can listen to a presentation and can perform keyword spotting or more complete speech recognition to detect defined keywords or keyphrases.

The media provisioning unit 940 can integrate the formatting information into the media asset as metadata. The metadata can control some aspects of the digital experience that includes the presentation of the media asset. As a result, the online portal product provides a straightforward and efficient way for a source device to seamlessly publish, curate, and promote their interactive webinar experiences alongside directed content that a source device can upload and host inside presentation platform described herein in connection with FIG. 1 or FIG. 4, or both.

Figure 12:
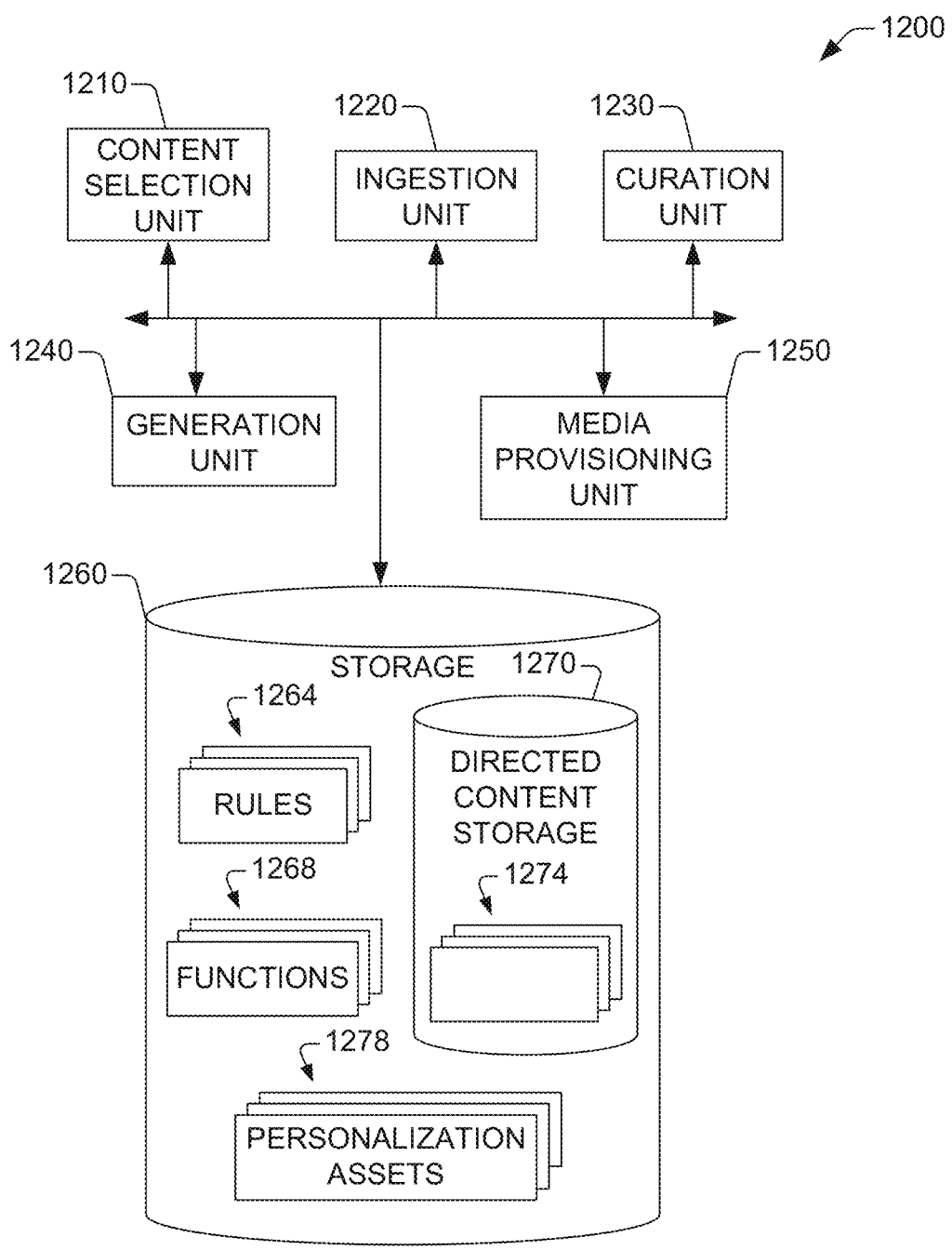
FIG. 12 illustrates an example of a personalization subsystem in a presentation platform for presentation of digital content, in accordance with one or more embodiments of this disclosure.

Besides the online portal product, or in some embodiments, the content management subsystem 130 can include a personalization subsystem 1200 as is illustrated in FIG. 12. The personalization subsystem 1200 can be a part of the content management subsystem 140 and can permit creating a personalized media asset that incorporates directed content. The personalization subsystem 1200 can permit, for example, generating, curating, and/or disseminating interactive webinar and video experiences and other multimedia content to distributed audience segments with relevant messaging, offers, and calls-to-action (e.g., view video, listen to podcast, signup for newsletter, attend a tradeshow, etc.).

The personalization subsystem 1200 can include a directed content selection unit 1210 that can identify directed content assets that can be relevant to a user device consuming a media asset. To that end, the content selection unit 1210 can direct an ingestion unit 1220 to obtain a group of directed content assets from directed content storage 1280 retaining a corpus of directed content assets 1284. In some cases, the corpus of directed content assets 1264 can be categorized according to attributes of an end-user. The attributes can include, for example, market type, market segment, geography, business size, business type, revenue, profits, and similar. Accordingly, for a particular user device for which the personalization is being implemented, the content selection unit 1210 can direct the ingestions unit 1220 to obtain directed content assets having a particular set of attributes. Simply as an illustration, the ingestion unit 1220 can obtain multiple directed content assets having the following attributes: industrial equipment, small-medium business (SMB), and U.S. Midwest.

In some cases, the ingestion unit 1220 can cause a source device to present the multiple directed content assets according to one of various formats. As mentioned, the multiple directed content assets can be presented as respective thumbnails or in a selectable carousel area.

The personalization subsystem 1200 also can include a curation unit 1230 that can receive input information indicating approval of one or several directed content assets for presentation with media assets. The input information can be received from the source device that personalizes the media asset. In other cases, the curation unit 1230 can evaluate each one the multiple directed content assets obtained by the ingestion unit 1220. An evaluation that satisfies one or more defined criteria results in the directed content asset being approved for presentation with media assets.

Regardless of approval mechanism, the curation unit 936 can then configure each one of the approved directed content asset(s) as being available for personalization. As mentioned, the approval and configuration represent the curation of those assets. The ingestion unit 1220 can update a corpus of personalization assets 1278 to include directed content assets that have been curated for a particular user-device within a storage 1260.

The personalization subsystem 1200 also can include a generation unit 1240 that can select one or several personalization assets of the personalization assets 1278 and can then incorporate the personalization asset(s) into a media asset being personalized. Incorporation of a personalization asset into the media asset can include, in some cases, adding one or several overlays to the media asset. A first overlay can include notes on a product described in the media asset. The overlay can be present for a defined duration that can be less than or equal to the duration of the media asset. Simply as an illustration, for industrial equipment, the note can be a description of capacity of a mining sifter or stability features of vibrating motor. A second overlay can include one or several links to respective documents (e.g., product whitepaper) related to the product. Further, or as another alternative, a third overlay can include a call-to-action related to the product.

Further, or in some cases, the generation unit 1240 can configure one or several functionality features to be made available during presentation of the media asset. Examples of the functionality features include translation, transcription, read-aloud, live chat, trainer/presenter scheduler, or similar. The type and number of functionality features that are configured can be based on the respective scores as is described above.

The generation unit 1240 can generate formatting information defining presentation attributes of one or several overlays to be included in the media asset being personalized. In addition, or in some cases, the generation unit 1240 also can generate second formatting information identifying the group of functionality features to be included with the media asset.

The media provisioning unit 940 can integrate available formatting information into the media asset as metadata. The metadata can control some aspects of the personalized digital experience that includes the presentation of the media asset. The media provisioning unit 1260, in some cases, also can configure one or more platforms/channels (web, mobile web, mobile app) to present the media asset. In addition, or in other cases, the media provisioning unit 1250 also can configure a group of rules that controls presentation of the media asset. As an example, the media provisioning unit 940 can define a rule that dictates that directed content is presented during specific time intervals during certain days. Further, or as another example, the media provisioning unit 1250 can configure another rule that dictates that directed content is presented during a particular period. For example, the particular period can be a defined number of days after initial consumption of the media asset. As yet another example, the media provisioning unit 1250 can define yet another rule that dictates that directed content is presented a defined number of times during a particular period.

Figure 13A:
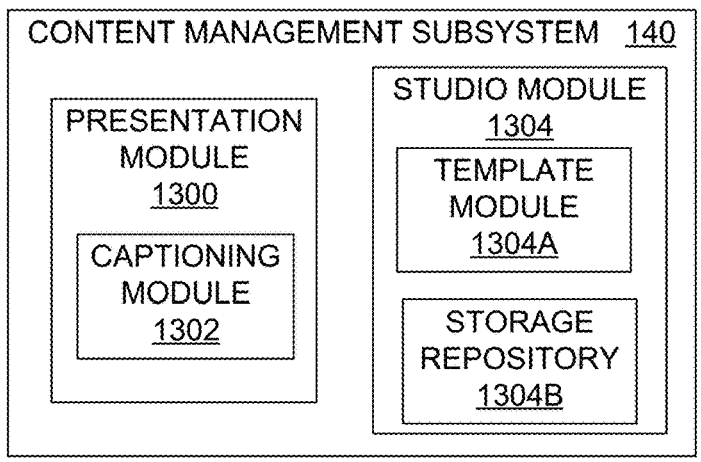
FIG. 13A illustrates example components of a content management subsystem, in accordance with one or more embodiments of this disclosure.

FIG. 13A shows example components of the content management subsystem 140. Digital content (e.g., the media assets 166) as described herein may be provided by a presentation module 1300 of the content management subsystem 140. For example, the media assets 166 may comprise interactive webinars. The webinars may comprise web-based presentations, livestreams, webcasts, etc. The phrases "webinar" and "communication session" may be used interchangeably herein. A communication session may comprise an entire webinar or a portion (e.g., component) of a webinar, such as a corresponding chat room/box. The presentation module 1300 may provide webinars at the user devices 102 via the client application 106. As further described herein, the webinars may be provided via a user interface(s) 1301 of the client application 106.

The webinars may comprise linear content (e.g., live, real-time content) and/or on-demand content (e.g., pre-recorded content). For example, the webinars may be livestreamed. As another example, the webinars may have been previously livestreamed and recorded. Previously-recorded webinars may be stored in the media repository 164 and accessible on-demand via the client application 106. As further described herein, a plurality of controls provided via the client application 106 may allow users of the user devices 102 to pause, fast-forward, and/or rewind previously-recorded webinars that are accessed/consumed on-demand.

As shown in FIG. 13A, the content management subsystem 140 may comprise a studio module 1304. The studio module 1304 may comprise a production environment, as discussed further herein with respect to FIGS. 15-17). The studio module 1304 may comprise a template module 1304A. The template module 1304A may be used to customize the user experience for a webinar using a plurality of stored templates (e.g., layout templates). For example, administrators and/or presenters of a webinar may use the template module 1304A to select a template from the plurality of stored templates for the webinar. The stored templates may comprise various configurations of user interface elements, as further described below with respect to FIG. 13B. For example, each template of the plurality of stored templates may comprise a particular background, font, font size, color scheme, theme, pattern, a combination thereof, and/or the like. The studio module 1304 may comprise (or be in communication with) a storage repository 1304B that allows any customization and/or selection made within the studio module 1304 to be saved (e.g., as a template).

Figure 13B:
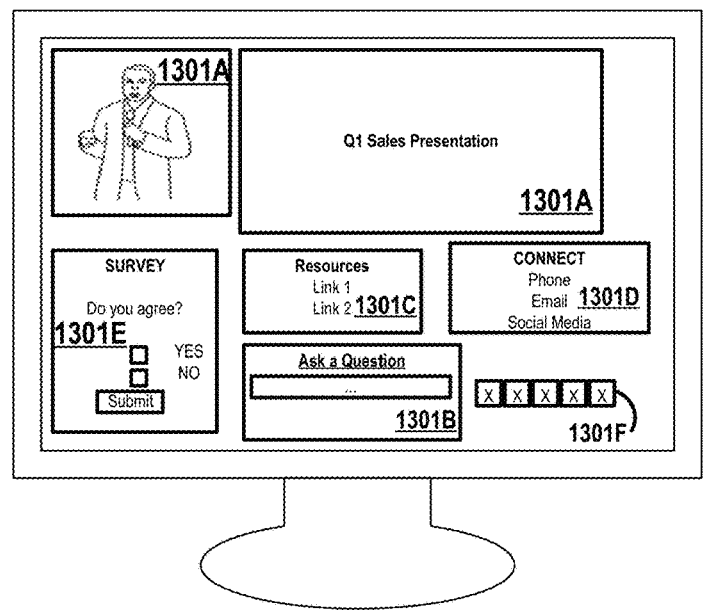
FIG. 13B illustrates an example of a digital experience, in accordance with one or more embodiments of this disclosure.

FIG. 13B shows an example of a user interface 1301 of an example webinar. The user interface 1301 may be generated by the presentation module 1300 and presented at the user devices 102 via the client application 106. The user interface 1301 for a particular webinar may comprise a background, font, font size, color scheme, theme, pattern, a combination thereof, and/or the like. The user interface 1301 may comprise a plurality of interface elements (e.g., "widgets") 1301A-1301F. The user interface 1301 and the plurality of interface elements 1301A-1301F may be configured for use on any computing device, mobile device, media player, etc. that supports rich web/Internet applications (e.g., HTML5, Adobe Flash™, Microsoft Silverlight™, etc.).

As shown in FIG. 13B, the user interface 1301 may comprise a media player element 1301A. The media player element 1301A may stream audio and/or video presented during a webinar. The media player element 1301A may comprise a plurality of controls (not shown) that allow users of the client application 106 to adjust a volume level, adjust a quality level (e.g., a bitrate), and/or adjust a window size. For webinars that are provided on-demand, the plurality of controls of the media player element 1301A may allow users of the client application 106 to pause, fast-forward, and/or rewind content presented via the media player element 1301A.

As another example, as shown in FIG. 13B, the user interface 1301 may comprise a Q&A element 1301B. The Q&A element 1301B may comprise a chat room/box that allows users of the client application 106 to interact with other users, administrators, and/or presenters of the webinar. The user interface 1301 may also comprise a resources element 1301C. The resources element 1301C may include a plurality of internal or external links to related content associated with the webinar, such as other webinars, videos, audio, images, documents, websites, a combination thereof, and/or the like.

The user interface 1301 may comprise a communication element 1301D. The communication element 1301D may allow users of the client application 106 to communicate with an entity associated with the webinar (e.g., a company, person, website, etc.). For example, the communication element 1301D may include links to email addresses, websites, telephone numbers, a combination thereof, and/or the like.

The user interface 1301 may comprise a survey/polling element 1301E. The survey/polling element 1301E may comprise a plurality of surveys and/or polls of various forms. The surveys and/or polls may allow users of the client application 106 to submit votes, provide feedback, interact with administrators and/or presenters (e.g., for a live webinar), interact with the entity associated with the webinar (e.g., a company, person, website, etc.), a combination thereof, and/or the like.

The user interface 1301 may comprise a plurality of customization elements 1301F. The plurality of customization elements 1301F may be associated with one or more customizable elements of the webinar, such as backgrounds, fonts, font sizes, color schemes, themes, patterns, combinations thereof, and/or the like. For example, the plurality of customization elements 1301F may allow the webinar to be customized via the studio module 1304. The plurality of customization elements 1301F may be customized to enhance user interaction with any of the plurality of interface elements (e.g., "widgets") described herein. For example, the plurality of customization elements 1301F may comprise a plurality of control buttons associated with the webinar, such as playback controls (e.g., pause, FF, RWD, etc.), internal and/or external links (e.g., to content within the webinar and/or online), communication links (e.g., email links, chat room/box links), a combination thereof, and/or the like.

Users may interact with the webinars via the user devices 102 and the client application 106. User interaction with the webinars may be monitored by the client application 106. For example, the user activity data 224 associated with the webinars provided by the presentation module 1300 may be monitored via the activity monitoring engine 220. Examples of the user activity data 224 associated with the webinars includes, but is not limited to, interaction with the user interface 1301 (e.g., one or more of the elements 1301A-1301F), interaction with the studio module 1304, a duration of a webinar consumed (e.g., streamed, played), a duration of inactivity during a webinar (e.g., inactivity indicated by the user device 102), a frequency or duration of movement (e.g., movement indicated by indicated by the user device 102), a combination thereof, and/or the like. The user activity data 224 associated with the webinars may be provided to the analytics subsystem 142 via the activity monitoring engine 220.

As shown in FIG. 13A, the presentation module 1300 may comprise a captioning module 1302. The captioning module 1302 may receive user utterance data and/or audio data of a webinar. The user utterance data may comprise one or more words spoken by a presenter(s) (e.g., speaker(s)) and/or an attendee(s) of a webinar. The audio data may comprise audio portions of any media content provided during a webinar, such as an audio track(s) of video content played during a webinar. The captioning module 1302 may convert the user utterance data and/or the audio data into closed captioning/subtitles. For example, the captioning module 1302 may comprise—or otherwise be in communication with—an automated speech recognition engine (not shown).

Figure 13C:
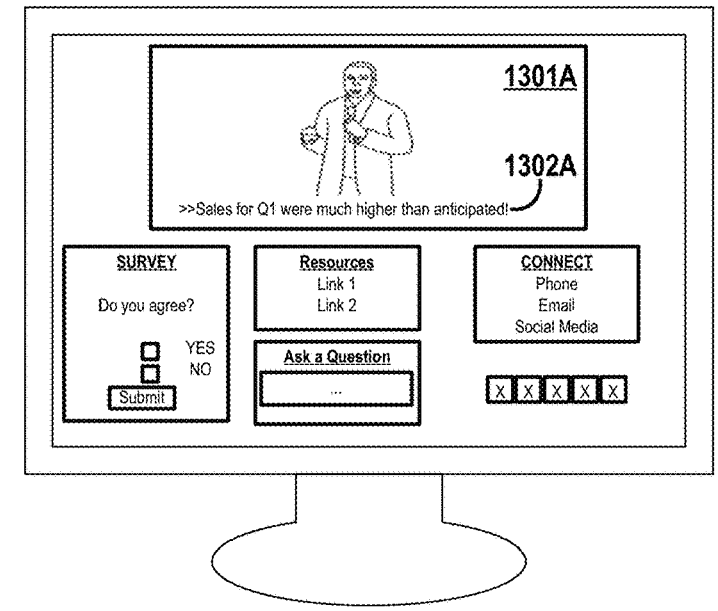
FIG. 13C illustrates another example of a digital experience, in accordance with one or more embodiments of this disclosure.

The automated speech recognition engine may process the user utterance data and output a transcription(s) of the one or more words spoken by the presenter(s) and/or the attendee(s) of the webinar in real-time or near real-time (e.g., for livestreamed content). Similarly, the automated speech recognition engine may process the audio data and output a transcription(s) of the audio portions of the media content provided during the webinar in real-time or near real-time (e.g., for livestreamed content). The captioning module 1302 may generate closed captioning/subtitles corresponding to the transcription(s) output by the automated speech recognition engine. The closed captioning/subtitles may be provided as an overlay 1302A of a webinar, as shown in FIG. 13C.

Figure 14A:
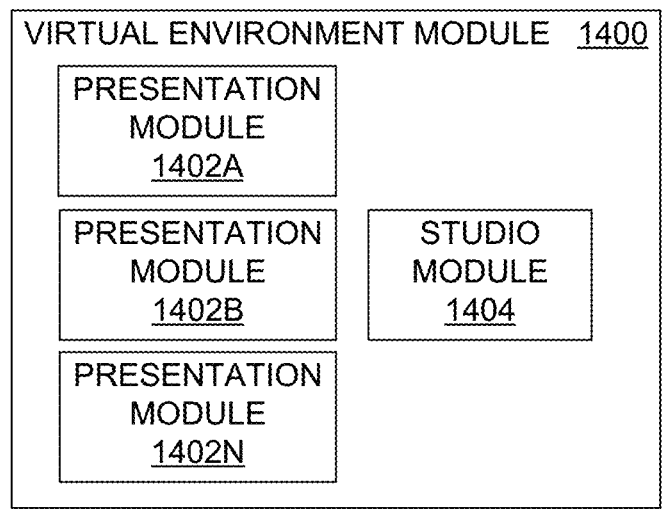
FIG. 14A illustrates a virtual environment module, in accordance with one or more embodiments of this disclosure.
Figure 14B:
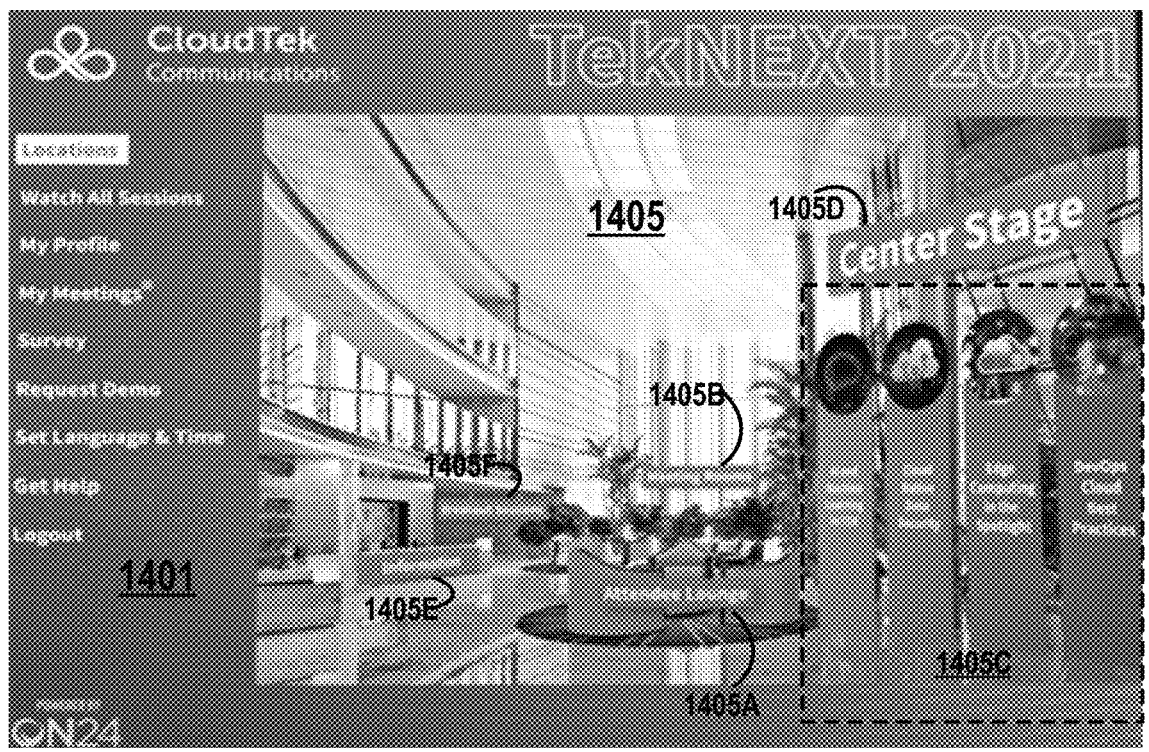
FIG. 14B illustrates an example of an interactive virtual environment, in accordance with one or more embodiments of this disclosure.

FIG. 14A shows a virtual environment module 1400. The virtual environment module 1400 may be a component of the content management subsystem 140. The virtual environment module 1400 may facilitate presentation of, and interactive with, a plurality of the media assets 166 in an interactive virtual environment 1401, as shown in FIG. 14B. For example, the virtual environment module 1400 may facilitate presentation of, and interactive with, a plurality of webinars at the user devices 102 via the client application 106 within the interactive virtual environment 1401. For example, as described herein, the media assets 166 may comprise interactive webinars (e.g., web-based presentations, livestreams, webcasts, etc.) that may be provided via the client application 106 by the presentation module 1300 within the interactive virtual environment 1401.

As shown in FIG. 14A, the virtual environment module 1400 may comprise a plurality of presentation modules 1402A, 1402B, 1402N. Each presentation module of the plurality of presentation modules 1402A, 1402B, 1402N may comprise an individual session, instance, virtualization, etc., of the presentation module 1300. For example, the plurality of presentation modules 1402A, 1402B, 1402N may comprise a plurality of simultaneous webinars (e.g., media assets 166) that are provided by the presentation module 1300 and via the client application 106. The virtual environment module 1400 may enable users of the user devices 102 to interact with each webinar via the interactive virtual environment 1401 and the client application 106.

Each of the plurality of presentation modules 1402A, 1402B, 1402N may comprise a communication session/webinar, such as a chat room/box, an audio call/session, a video call/session, a combination thereof, and/or the like. As an example, and as further described herein, the interactive virtual environment 1401 may comprise a virtual conference/tradeshow, and each of the plurality of presentation modules 1402A, 1402B, 1402N may comprise a communication session that may function as a virtual "vendor booth," "lounge," "meeting room," "auditorium," etc., at the virtual conference/tradeshow. In this way, the plurality of presentation modules 1402A, 1402B, 1402N may enable users at the user devices 102 to communicate with other users and/or devices via the interactive virtual environment 1401 and the client application 106.

Users of the user devices 102 may interact with the interactive virtual environment 1401 via the client application. The service management subsystem 138 may administer (e.g., control) such interactions between the user devices 102 and the interactive virtual environment 1401. For example, the service management subsystem 138 may generate a session identifier (or any other suitable identifier) for each of the communication sessions (e.g., webinars)—or components thereof (e.g., chat rooms/boxes)—within the interactive virtual environment 1401. The service management subsystem 138 may use the session identifiers to ensure that only the user devices 102 associated with a particular communication session (e.g., via registration/sign-up, etc.) may interact with the particular communication session.

As described herein, the media assets 166 may comprise interactive webinars (e.g., web-based presentations, livestreams, webcasts, etc.) that may be provided via the client application 106 by the presentation module 1300 within the interactive virtual environment 1401. The media assets 166 may comprise linear content (e.g., live, real-time content) and/or on-demand (e.g., pre-recorded content). For example, the media assets 166 may be livestreamed within the interactive virtual environment 1401 according to a schedule of a corresponding virtual conference/tradeshow (e.g., a "live" conference/tradeshow). As another example, the media assets 166 corresponding to another virtual conference/tradeshow may be pre-recorded, and the media assets 166 may be accessible via the media repository 164 on-demand via the client application 106. For virtual conferences/tradeshows that are not live or real-time (e.g., the corresponding media assets are pre-recorded), the interactive virtual environment 1401 may nevertheless allow a user(s) of a user device(s) 102 to interact with the virtual conference/tradeshow as if it were live or being held in real-time. As an example, the interactive virtual environment 1401 may allow the user(s) of the user device(s) 102 to interact with an on-demand virtual conference/tradeshow as if the user(s) were actually present when the corresponding communication sessions (e.g., webinars) were being held/recorded. In this way, the user(s) of the user device(s) 102 may interact with the on-demand virtual conference/tradeshow as an observer in simulated-real-time. The user(s) may navigate to different communication sessions of the on-demand virtual conference/tradeshow via the interactive virtual environment 1401, and the user-experience may only be limited in that certain aspects, such as chat rooms/boxes, may not be available for direct interaction. The user(s) may navigate within the on-demand virtual conference/tradeshow via the interactive virtual environment 1401 in 1:1 simulated-real-time or in compressed/shifted time. For example, the user(s) may "fast-forward" or "rewind" to different portions of the on-demand virtual conference/tradeshow via the interactive virtual environment 1401. In this way, the user(s) may be able to skip certain portions of a communication session and/or re-experience certain portions of a communication session of the on-demand virtual conference/tradeshow.

As shown in FIG. 14A, the virtual environment module 1400 may comprise a studio module 1404. The studio module 1404 may function similar to the studio module 1304 described herein. For example, the studio module 1404 may allow administrators and/or presenters of a virtual conference/tradeshow—or a session/webinar thereof—to record, livestream, and/or upload multimedia presentations/content for the virtual conference/tradeshow. The studio module 1404 may allow administrators and/or presenters of a virtual conference/tradeshow—or a session/webinar thereof—to customize the user experience using the template module 1304A and the plurality of templates (e.g., layouts) stored in the storage repository 1304B. For example, administrators and/or presenters of a virtual conference/tradeshow—or a session/webinar thereof—may use the studio module 1404 to select a template from the plurality of templates stored in the storage repository 1304B. The studio module 1404 may store/save any customization and/or selection made within the studio module 1404 to the storage repository 1304B.

User interaction with virtual conferences/tradeshows via the interactive virtual environment 1401, whether the virtual conferences/tradeshows are real-time or on-demand, may be monitored by the client application 106. For example, user interaction with virtual conferences/tradeshows via the interactive virtual environment 1401 may be monitored via the activity monitoring engine 220 and stored as user activity data 224. The user activity data 224 associated with the virtual conferences/tradeshows may include, as an example, interaction with the user interface 1301 (e.g., one or more of the elements 1301A-401F) within a particular communication session/webinar. As another example, the user activity data 224 associated with the virtual conferences/tradeshows may include interaction with the studio module 1404. Further examples of the user activity data 224 associated with the virtual conferences/tradeshows include, but are not limited to, a duration of a communication session/webinar consumed (e.g., streamed, played), a duration of inactivity during a communication session/webinar (e.g., inactivity indicated by the user device 102), a frequency or duration of movement (e.g., movement indicated by indicated by the user device 102), a combination thereof, and/or the like. The user activity data 224 associated with the virtual conferences/tradeshows may be provided to the analytics subsystem 142 via the activity monitoring engine 220.

FIG. 14B shows an example lobby 1405 of a virtual conference/tradeshow within the interactive virtual environment 1401. The interactive virtual environment 1401 provided via the client application 106 may enable a visual, audible, and/or physical interaction between the users of the user devices 102 and areas/events within a virtual conference/tradeshow, as indicated by the lobby 1405. For example, as shown in the lobby 1405 in FIG. 14B, the interactive virtual environment 1401 may provide the users of the user devices 102 with a rendered scene of a virtual conference/tradeshow. As discussed above, the interactive virtual environment 1401 may allow the users of the user devices 102 to interact with the virtual conference/tradeshow in real-time or on-demand. The manner in which the users of the user devices 102 interact with the virtual conference/tradeshow may correspond to capabilities of the user devices 102. For example, if a particular user device 102 is a smart phone, user interaction may be facilitated by a user interacting with a touch screen of the smart phone. As another example, if a particular user device 102 is a computer or gaming console, user interaction may be facilitated by a user via a keyboard, mouse, and/or a gaming controller. Other examples are possible as well. The user devices 102 may include additional components that enable user interaction, such as sensors, cameras, speakers, etc. The interactive virtual environment 1401 of a virtual conference/tradeshow may be presented via the client application 106 in various formats such as, for example, two-dimensional or three-dimensional visual displays (including projections), sound, haptic feedback, and/or tactile feedback. The interactive virtual environment 1401 may comprise, for example, portions using augmented reality, virtual reality, a combination thereof, and/or the like.

A user may interact with the lobby 1405 via the interactive virtual environment 1401 and the user interface(s) 1301 of the client application 106. As an example, as shown in FIG. 14B, the lobby 1405 may allow a user to navigate to a virtual attendee lounge 1405A, meeting rooms 1405B, a plurality of presentations 1405C at a virtual auditorium ("Center Stage") 1405D, an information desk 1405E, and breakout sessions 1405F. The virtual attendee lounge 1405A, the meeting rooms 1405B, each of the plurality of presentations 1405C at the virtual auditorium 1405D, the information desk 1405D, and the breakout sessions 1405F may be facilitated by the virtual environment module 1400 and the plurality of presentation modules 1402A, 1402B, 1402N.

The presentation module 1402A may be associated with a first part of the virtual conference/tradeshow, such as the virtual attendee lounge 1405A, the presentation module 1402B may be associated with another part of the virtual conference/tradeshow, such one or more of the breakout sessions 1405F, and the presentation module 1402N may be associated with a further part of the virtual conference/tradeshow, such as one or more of the plurality of presentations 1405C in the virtual auditorium ("Center Stage") 1405D. As an example, a user may choose to view one of the plurality of presentations 1405C. As discussed herein, the user device(s) 102 may be smart phones, in which case the user may touch an area of a screen of the smart phone displaying the particular presentation of the plurality of presentations 1405C he or she wishes to view. The presentation module 1402N may receive a request from the smart phone via the client device 106 indicating that the user wishes to view the particular presentation. The presentation module 1402N may cause the smart phone, via the client application 106, to render a user interface associated with the particular presentation, such as the user interface 1301. The user may view the particular presentation and interact therewith via the user interface in a similar manner as described herein with respect to the user interface 1301. The user interface associated with the presentation may comprise an exit option, such as a button (e.g., a customization element 1301F), which may cause the smart phone, via the client application 106, to "leave" the presentation and "return" the user to the lobby 1405. For example, the user may press on an area of the smart phone's screen displaying the exit option/button, and the presentation module 1402N may cause the smart phone, via the client application 106, to render the lobby 1405 (e.g., "returning" the user to the lobby of the virtual conference/tradeshow).

In some embodiments, the analytics subsystem 142 also can determine digital content (e.g., media assets) that is/are similar to other digital content that is present in a corpus digital content for a user device (e.g., associated with a user profile/UIC). For example, the analytics subsystem 142 can generate a recommendation for the similar content and can then send the recommendation to a user device.

Figure 15:
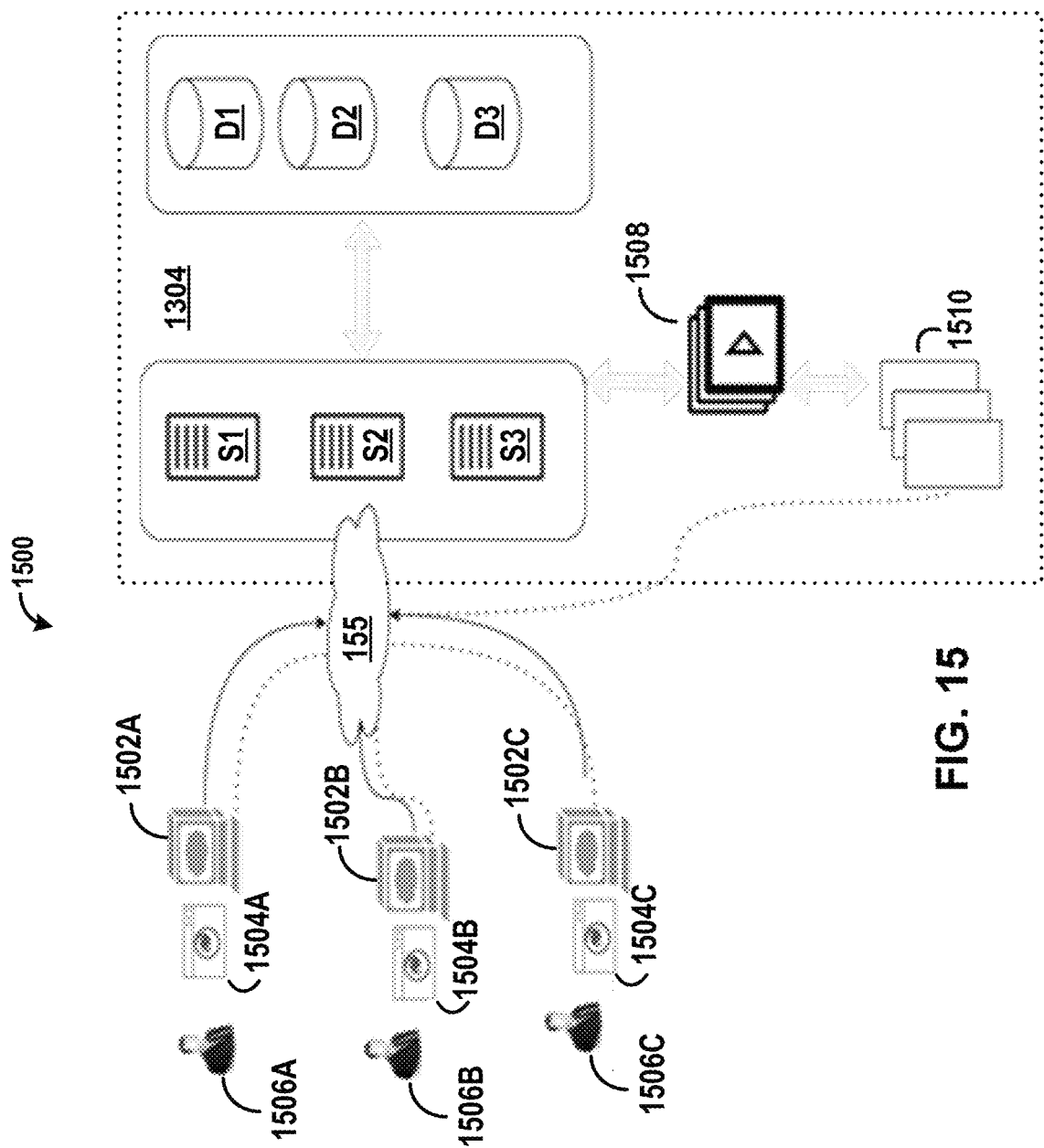
FIG. 15 illustrates an example system, in accordance with one or more embodiments of this disclosure.

Turning now to FIG. 15, and example system 1500 for improved content creation and synchronization is shown. As discussed herein, the present distribution/presentation platform may comprise a system 100 of computing devices, servers, software, etc., that is configured to present media assets (e.g., the corpora of media assets 324) at the user devices 102. The media assets may include webinars, such as web-based presentations, livestreams, webcasts, etc., that include elements of video content, audio content, rich-media content, and interactive content.

FIG. 15 shows a system 1500 for generating, recording, and editing media assets. A plurality of users 1506A, 1506B, 1506C may collaborate via a plurality of user devices 1502A, 1502B, 1502C (e.g., such as the user devices 102) to create a media asset, such as a webinar, as described herein. For example, the plurality of user devices 1502A, 1502B, 1502C may each execute an instance 1504A, 1504B, 1504C of the client application 106, which may act as a gateway between the plurality of user devices 1502A, 1502B, 1502C and the studio module 1304 of the content management subsystem 140 via the network architecture 155. The plurality of users 1506A, 1506B, 1506C may interact with the studio module 1304 to record, generate, and/or edit content for the media asset.

A first user device 1502A of the plurality of user devices 1502A, 1502B, 1502C may be associated with a first user 1506A (e.g., a presenter of the media asset/webinar). The first user 1506A may generate, via the instance 1504A of the client application 106 and the studio module 1304, first content for the media asset. The first content may comprise recorded audio, video, or a combination thereof. For example, the first content may comprise frames of video and/or audio recorded via the studio module 1304, chunks/segments of video/audio recorded via the studio module 1304, etc.). The first user device 1502A may send the first content to a computing device 1510 in communication with the plurality of user devices 1502A, 1502B, 1502C. The computing device 1510 may comprise a server(s), such as a conference server(s). The computing device 1510 may determine a first plurality of content elements 1508 associated with the first content. The first plurality of content elements 1508 may comprise, for example, a first identifier, a first beginning timestamp, a first ending timestamp, an identifier for the media asset, a first identifier for the first content, a session identifier associated with the plurality of user devices 1502A, 1502B, 1502C, a combination thereof, and/or the like. As another example, the first plurality of content elements 1508 may comprise one or more portions of the first content itself (e.g., one or more frames of video and/or audio recorded via the studio module 1304, one or more chunks/segments of video/audio recorded via the studio module 1304, etc.). The first plurality of content elements 1508 may be sent by the computing device 1510 to one or more content servers S1, S2, S3. Any of the one or more content servers S1, S2, S3 may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein. The one or more content servers S1, S2, S3 may receive the first plurality of content elements and store the same in a database, such as one of the databases D1, D2, D3 shown in FIG. 15. Any of the one of the databases D1, D2, D3 may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein.

A second user device 1502B of the plurality of user devices 1502A, 1502B, 1502C may be associated with a second user 1506B (e.g., a presenter of the media asset/webinar). The second user 1506B may generate, via the instance 1504B of the client application 106 and the studio module 1304, second content for the media asset. The second content may comprise recorded audio, video, or a combination thereof. For example, the second content may comprise frames of video and/or audio recorded via the studio module 1304, chunks/segments of video/audio recorded via the studio module 1304, etc.). The second user device 1502B may send the second content to the computing device 1510. The computing device 1510 may determine a second plurality of content elements 1508 associated with the second content. The second plurality of content elements 1508 may comprise, for example, a second identifier, a second beginning timestamp, a second ending timestamp, the identifier for the media asset, a second identifier for the second content, the session identifier associated with the plurality of user devices 1502A, 1502B, 1502C, a combination thereof, and/or the like. As another example, the second plurality of content elements 1508 may comprise one or more portions of the second content itself (e.g., one or more frames of video and/or audio recorded via the studio module 1304, one or more chunks/segments of video/audio recorded via the studio module 1304, etc.). The second plurality of content elements 1508 may be sent by the computing device 1510 to the one or more content servers S1, S2, S3. The one or more content servers S1, S2, S3 may receive the second plurality of content elements and store the same in a database, such as one of the databases D1, D2, D3 shown in FIG. 15.

Figure 16:
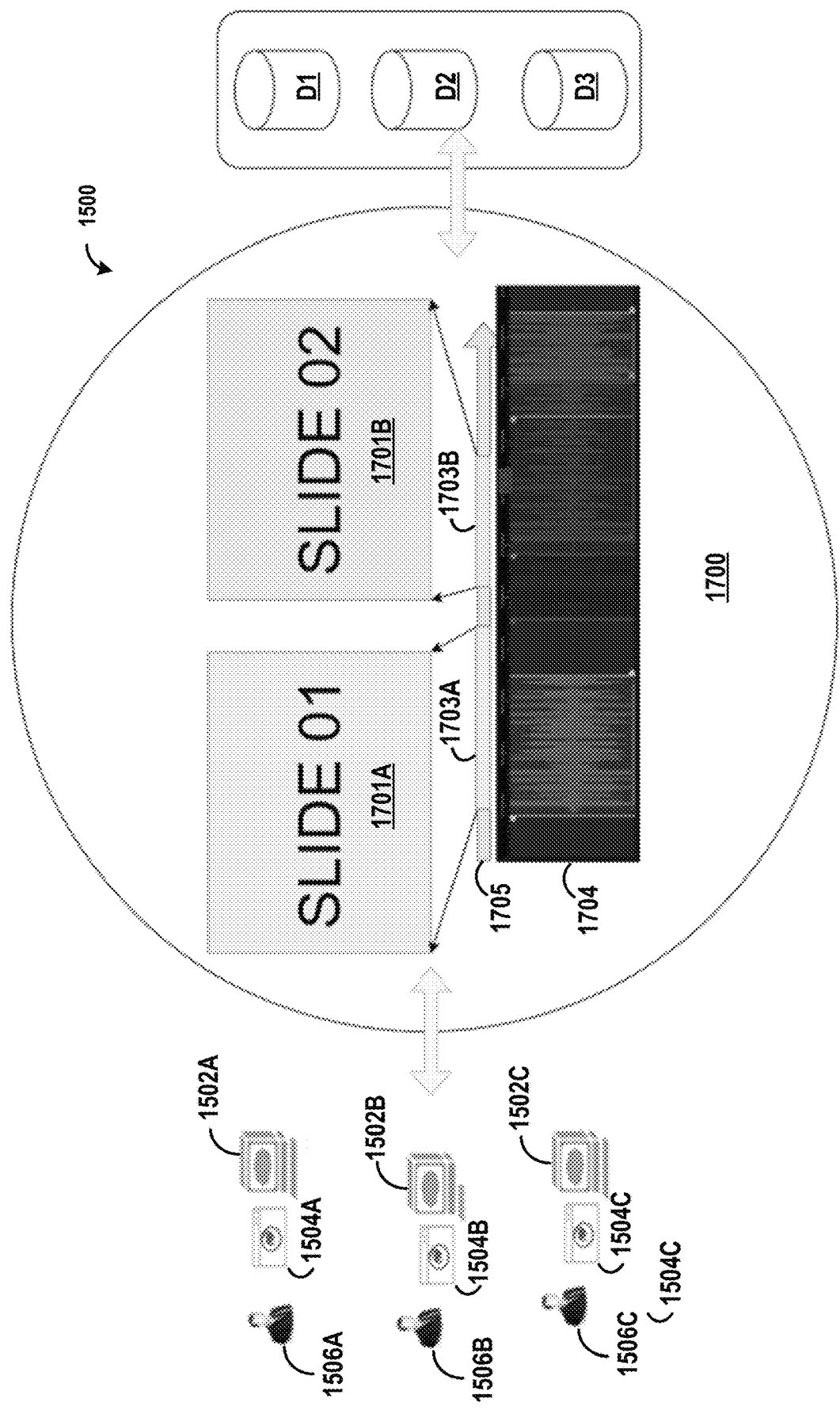
FIG. 16 illustrates an example system, in accordance with one or more embodiments of this disclosure.

The computing device 1510 may send the second plurality of content elements 1508 and/or an indication thereof to the first user device 1502A. The first user device 1502A may receive the second plurality of content elements 1508 and/or the indication thereof. The first user device 1502A may generate (or be caused to generate by the studio module 1304) a user interface of a production environment configured for editing the media asset. For example, the production environment may allow the plurality of users 1506A, 1506B, 1506C to collaborate via the plurality of user devices 1502A, 1502B, 1502C to create the media asset. The production environment may comprise one or more elements of the studio module 1304, such as the template module 1304A described herein. For example, FIG. 16 shows an example user interface 1700 of the production environment. The user interface 1700 may facilitate the first user 1506A editing, revising, etc. the first content and/or the second content. For example, as shown in FIG. 16, the user interface 1700 may comprise an editing element 1704 that shows the first and/or second content represented along a timeline 1705. The first content and/or the second content may be represented along the timeline 1705 within the editing element 1704 based on the first plurality of content elements and/or the second plurality of content elements 1510.

Figure 17A:
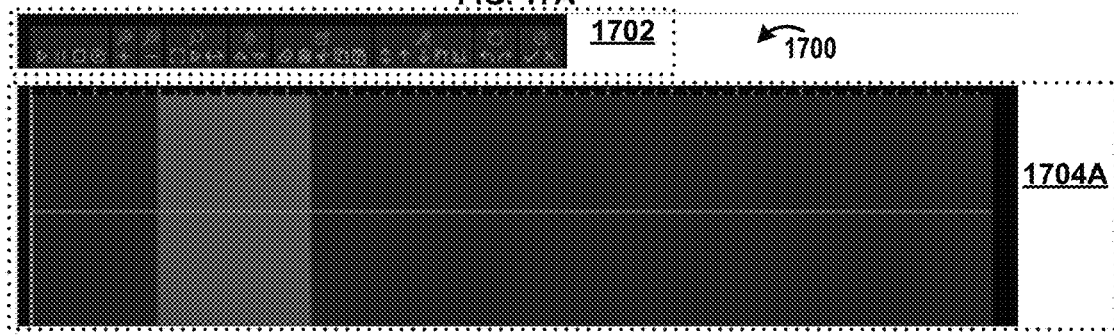
FIG. 17A illustrates an example user interface, in accordance with one or more embodiments of this disclosure.
Figure 17B:
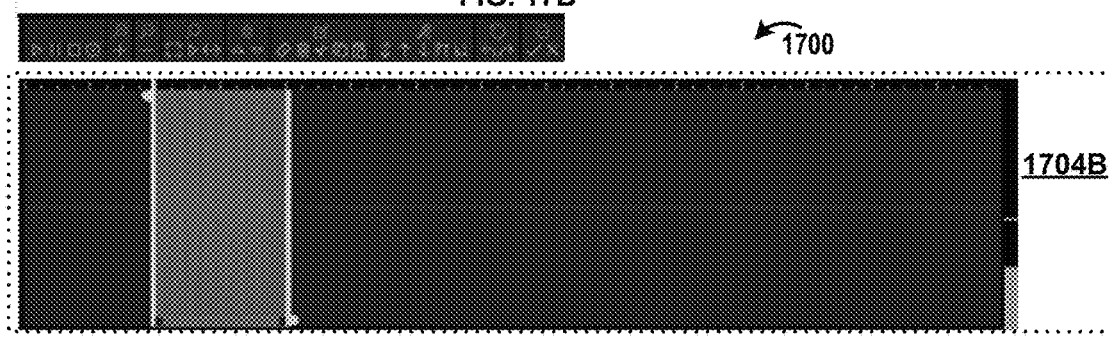
FIG. 17B illustrates an example user interface, in accordance with one or more embodiments of this disclosure.
Figure 17C:
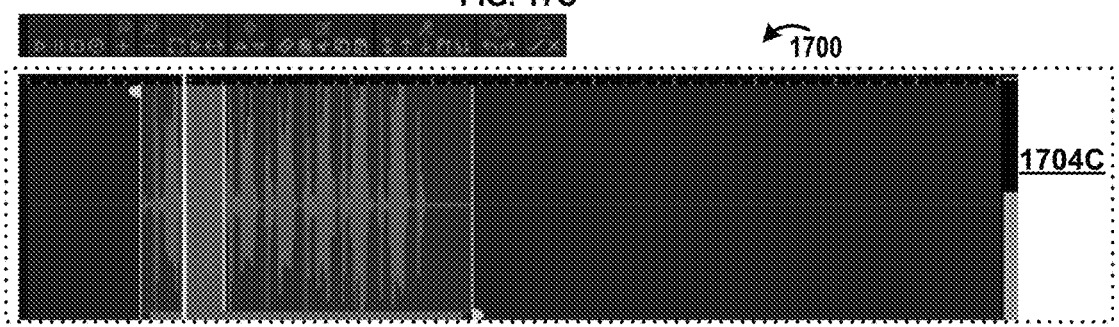
FIG. 17C illustrates an example user interface, in accordance with one or more embodiments of this disclosure.
Figure 17D:
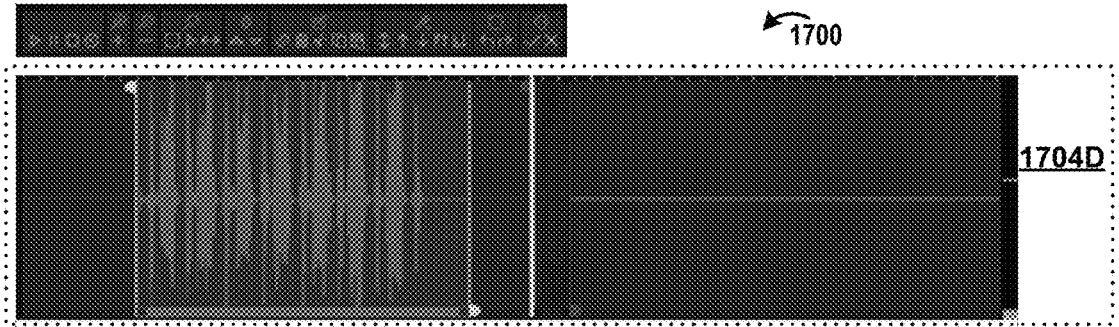
FIG. 17D illustrates an example user interface, in accordance with one or more embodiments of this disclosure.
Figure 17E:
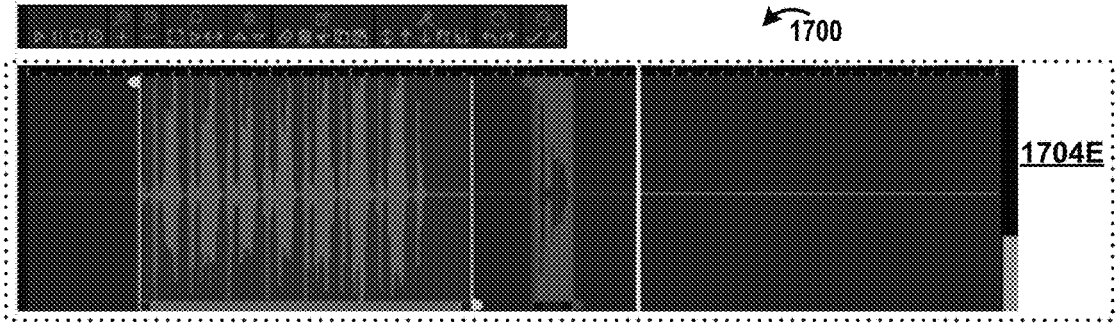
FIG. 17E illustrates an example user interface, in accordance with one or more embodiments of this disclosure.

The first user 1506A, via the first user device 1502A, may interact with the editing element 1704 to edit, revise, etc., the first content or the second content. For example, a first object associated with the first content and a second object associated with the second content (e.g., waveforms of audio) may be generated at the editing element 1704. The first user 1506A, via the first user device 1502A, may generate at least one user interaction via the editing element 1704 with the first content or the second content by interacting with the first object or the second object. FIGS. 17A-17E show a plurality of examples of the user interface 1700 and the editing element 1704. As shown in FIG. 17A, the user interface 1700 may comprise a toolbar 1702 comprising a plurality of editing tools 1702 (e.g., copying/cutting/pasting tools, zoom tools, playing operations (FF, RWD, pause), etc.). FIG. 17A shows an example of an empty editing element 1704A (e.g., without any content shown for editing). FIG. 17B shows an example editing element 1704B comprising content, such as a waveform of record audio (e.g., the first object or the second object described herein). FIG. 17C shows an example editing element 1704C depicting a zoom function of the production environment. FIG. 17D shows an example editing element 1704D for editing two waveforms of audio. FIG. 17E shows an example editing element 1704E comprising a fade-out filter applied to a waveform of audio.

The at least one user interaction described herein may comprise one or more of the following: a movement of the first object or the second object along the timeline 1705; a cutting command associated with the first object or the second object; a pasting command associated with the first object or the second object; a re-recording marker associated with the first object or the second object; a fade-in effect applied to the first object or the second object; a fade-out effect applied to the first object or the second object; a filter applied to the first object or the second object; or an adjustment of a level of gain associated with the first object or the second object. Other examples are possible as well.

As a specific example shown in FIG. 16, the first user 1506A, via the first user device 1502A, may associate a first portion 1710A and a second portion 1710B of a supplemental media asset with the first content and/or the second content. The first user 1506A may associate the first portion 1710A and the second portion 1710B of the supplemental media asset with the first content and/or the second content by dragging an indicator 1703A, 1703B each along the timeline 1705 above the depicted first object (e.g., the first waveform), the second object (e.g., the second waveform), a third object (e.g., a third waveform), and a fourth object (e.g., a fourth waveform). The first user 1506A may control a duration for each of the first portion 1710A and the second portion 1710B by extending the indicator 1703A, 1703B along the timeline 1705. For example, the supplemental media asset may comprise at least one of: a slideshow, video content, a poll, etc. The first portion 1710A and/or the second portion 1710B of the supplemental media asset may each comprise a slide of the slideshow and/or a portion of the video content, and each may be associated with a beginning timestamp and an ending timestamp of the first or second content (e.g., to indicate the duration of each within the media asset).

The first user device 1502A may send an indication of the at least one user interaction to the computing device 1510. The indication of the at least one user interaction may comprise one or more of the first plurality of content elements or the second plurality of content elements (e.g., based on the type of interaction/what was edited by the first user 1506A). The indication of the at least one user interaction may cause the computing device 1510 to synchronize the first content and the second content within the media asset. For example, the computing device 1510 may synchronize the first content and the second content within the media asset based on: the at least one user interaction, the first plurality of content elements, and/or the second plurality of content elements. The computing device 1510 may send the indication of the at least one user interaction (e.g., metadata) to the one or more content servers S1, S2, S3. The one or more content servers S1, S2, S3 may store the indication of the at least one user interaction (e.g., metadata) at one of the databases D1, D2, D3. In this way, any editing/revision/content generation performed at any one of the plurality of user devices 1502A, 1502B, 1502C may be synchronized in real-time.

Figure 18:
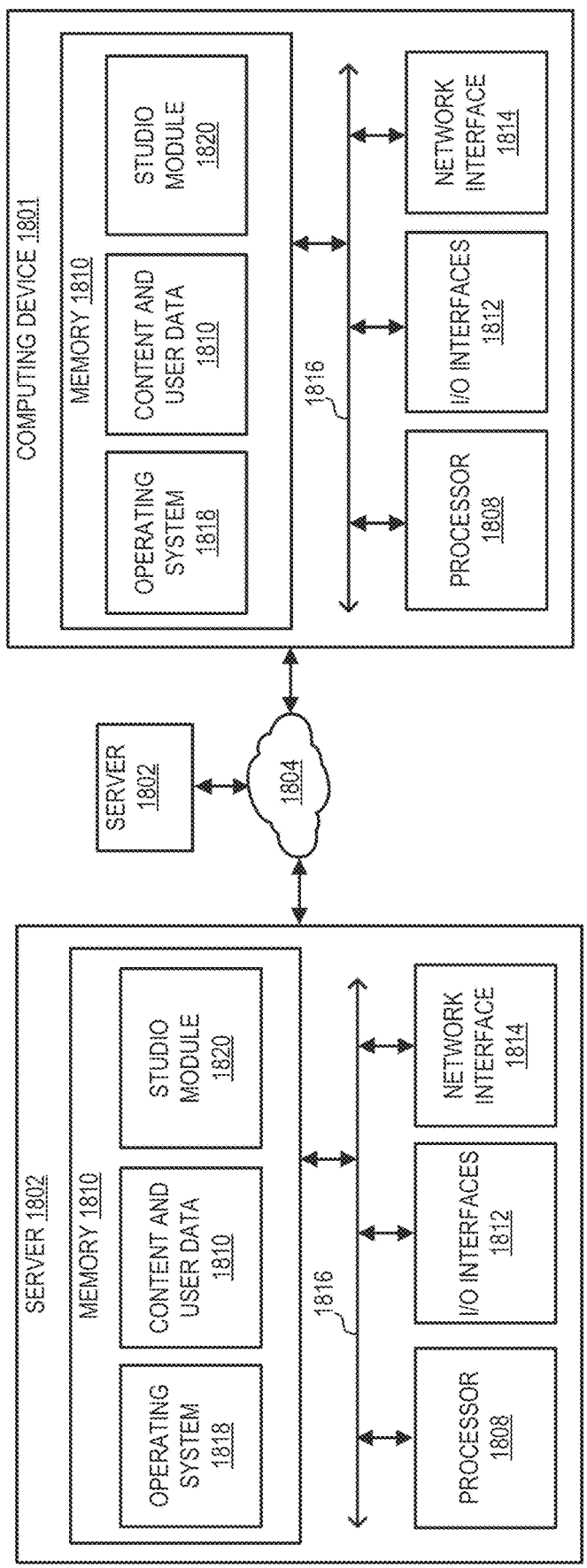
FIG. 18 illustrates an example system, in accordance with one or more embodiments of this disclosure.

As discussed herein, the present methods and systems may be computer-implemented. FIG. 18 shows a block diagram depicting an environment 1800 comprising non-limiting examples of a computing device 1801 and a server 1802 connected through a network 1804, such as the network architecture 155. The computing device 1801 and/or the server 1802 may be any one of the devices, components, units, or modules shown in FIG. 1-3, 5-7, 9, or 12-17. In an aspect, some or all steps of any described method herein may be performed on a computing device as described herein. The computing device 1801 may comprise one or multiple computers configured to store one or more of a studio module 1820 (e.g., studio module 1304,1404), content and user data 1815, and the like. The server 1802 may comprise one or multiple computers configured to store one or more of the studio module 1820, the content and user data 1815, and the like. Multiple servers 1802 may communicate with the computing device 1801 via the through the network 1804.

The computing device 1801 and the server 1802 may each be a digital computer that, in terms of hardware architecture, generally includes a processor 1808, memory system 1810, input/output (I/O) interfaces 1812, and network interfaces 1814. These components (1808, 1810, 1812, and 1814) are communicatively coupled via a local interface 1816. The local interface 1816 may be, for example, but not limited to, one or more buses or other wired or wireless connections, as is known in the art. The local interface 1816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1808 may be a hardware device for executing software, particularly that stored in memory system 1810. The processor 1808 may be any custom made or commercially available processor, a central processing unit (CPU), an auxiliary processor among several processors associated with the computing device 1801 and the server 1802, a semiconductor-based microprocessor (in the form of a microchip or chip set), or generally any device for executing software instructions. When the computing device 1801 and/or the server 1802 is in operation, the processor 1808 may be configured to execute software stored within the memory system 1810, to communicate data to and from the memory system 1810, and to generally control operations of the computing device 1801 and the server 1802 pursuant to the software.

The I/O interfaces 1812 may be used to receive user input from, and/or for providing system output to, one or more devices or components. User input may be received via, for example, a keyboard and/or a mouse. System output may comprise a display device and a printer (not shown). I/O interfaces 1812 may include, for example, a serial port, a parallel port, a Small Computer System Interface (SCSI), an infrared (IR) interface, a radio frequency (RF) interface, and/or a universal serial bus (USB) interface.

The network interface 1814 may be used to transmit and receive from the computing device 1801 and/or the server 1802 on the network 1804. The network interface 1814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 1814 may include address, control, and/or data connections to enable appropriate communications on the network 1804.

The memory system 1810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1810 may incorporate electronic, magnetic, optical, and/or other types of storage media. Note that the memory system 1810 may have a distributed architecture, where various components are situated remote from one another, but may be accessed by the processor 1808.

The software in memory system 1810 may include one or more software programs, each of which comprises an ordered listing of executable instructions for implementing logical functions. In the example of FIG. 18, the software in the memory system 1810 of the computing device 1801 may comprise a suitable operating system (O/S) 1818. In the example of FIG. 18, the software in the memory system 1810 of the server 1802 may comprise, the video data 1824, and a suitable operating system (O/S) 1818. The operating system 1818 essentially controls the execution of other computer programs and provides scheduling, input-output control, file and data management, memory management, and communication control and related services.

For purposes of illustration, application programs and other executable program components such as the operating system 1818 are illustrated herein as discrete blocks, although it is recognized that such programs and components may reside at various times in different storage components of the computing device 1801 and/or the server 1802. An implementation of the methods described herein may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

FIG. 19 shows a flowchart of an example method 1900 for improved content creation and synchronization. The method 1900 may be performed in whole or in part by a single computing device, a plurality of computing devices, and the like. For example, any one of the devices, components, units, or modules shown in FIG. 1-3, 5-7, 9, 12-16, or 18 may be configured to perform the method 1900.

A plurality of users (e.g., the users 1506A, 1506B, 1506C) may collaborate via a plurality of user devices (e.g., the user devices 1502A, 1502B, 1502C and/or the user device 102) to create a media asset, such as a webinar, as described herein. For example, the plurality of user devices may each execute an instance of a client application (e.g., the client application 106). The client application may act as a gateway between the plurality of user devices and a studio module (e.g., the studio module 1304). The plurality of users may interact with the studio module to record, generate, and/or edit content for the media asset.

At step 1910, a first user of the plurality of users (e.g., a presenter of the media asset/webinar) may generate first content associated with the media asset via a first user device of the plurality of user devices. For example, the first user may generate, via an instance of the client application and the studio module, first content for the media asset. The first content may comprise recorded audio, video, or a combination thereof. For example, the first content may comprise frames of video and/or audio recorded via the studio module, chunks/segments of video/audio recorded via the studio module, etc.). At step 1920, the first user device may send the first content to a computing device (e.g., the computing device 1510) in communication with the plurality of user devices. The computing device may comprise a server(s), such as a conference server(s). The computing device may determine a first plurality of content elements associated with the first content. The first plurality of content elements may comprise, for example, a first identifier, a first beginning timestamp, a first ending timestamp, an identifier for the media asset, a first identifier for the first content, a session identifier associated with the plurality of user devices, a combination thereof, and/or the like. As another example, the first plurality of content elements may comprise one or more portions of the first content itself (e.g., one or more frames of video and/or audio recorded via the studio 1304, one or more chunks/segments of video/audio recorded via the studio module, etc.).

The first plurality of content elements may be sent by the computing device to one or more content servers. Any of the one or more content servers may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein. The one or more content servers may receive the first plurality of content elements and store the same in a database, such as one of the databases D1, D2, D3 shown in FIG. 15. The database may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein.

A second user device of the plurality of user devices may be associated with a second user (e.g., a presenter of the media asset/webinar). The second user may generate, via another instance of the client application and the studio module (e.g., executing on the second user device), second content for the media asset. The second content may comprise recorded audio, video, or a combination thereof. For example, the second content may comprise frames of video and/or audio recorded via the studio module, chunks/segments of video/audio recorded via the studio module, etc.). The second user device may send the second content to the computing device.

The computing may determine a second plurality of content elements associated with the second content. The second plurality of content elements may comprise, for example, a second identifier, a second beginning timestamp, a second ending timestamp, the identifier for the media asset, a second identifier for the second content, the session identifier associated with the plurality of user devices, a combination thereof, and/or the like. As another example, the second plurality of content elements may comprise one or more portions of the second content itself (e.g., one or more frames of video and/or audio recorded via the studio module, one or more chunks/segments of video/audio recorded via the studio module, etc.). The second plurality of content elements may be sent by the computing device to the one or more content servers. The one or more content servers may receive the second plurality of content elements and store the same in a database, such as one of the databases D1, D2, D3 shown in FIG. 15.

At step 1930, the first user device may receive the second content from the computing device. For example, the computing device may send the second plurality of content elements and/or an indication thereof to the first user device. The first user device may receive the second plurality of content elements and/or the indication thereof. At step 1940, the first user device may generate (or be caused to generate by the studio module) a user interface of a production environment configured for editing the media asset. For example, the production environment may allow the plurality of users to collaborate via the plurality of user devices to create, revise, etc., etc., the media asset. The production environment may comprise one or more elements of the studio module 1304, such as the template module 1304A described herein. The user interface may facilitate the first user editing, revising, etc. the first content and/or the second content. For example, the user interface may comprise an editing element that shows the first and/or second content represented along a timeline. The first content and/or the second content may be represented along the timeline within the editing element based on the first plurality of content elements and/or the second plurality of content elements.

At step 1950, the first user device may receive, via the user interface, at least one user interaction. For example, the first user, via the first user device and the user interface, may interact with the editing element to edit, revise, etc., the first content or the second content. For example, a first object associated with the first content and a second object associated with the second content (e.g., waveforms of audio) may be generated at the editing element. The first user, via the first user device and the user interface, may generate the at least one user interaction via the editing element with the first content or the second content by interacting with the first object or the second object. The at least one user interaction may comprise one or more of the following: a movement of the first object or the second object along the timeline; a cutting command associated with the first object or the second object; a pasting command associated with the first object or the second object; a re-recording marker associated with the first object or the second object; a fade-in effect applied to the first object or the second object; a fade-out effect applied to the first object or the second object; a filter applied to the first object or the second object; or an adjustment of a level of gain associated with the first object or the second object. Other examples are possible as well.

At step 1960, the first user device may send an indication of the at least one user interaction to the computing device. The indication of the at least one user interaction may comprise one or more of the first plurality of content elements or the second plurality of content elements (e.g., based on the type of interaction/what was edited by the first user). The indication of the at least one user interaction may cause the computing device to synchronize the first content and the second content within the media asset. For example, the computing device may synchronize the first content and the second content within the media asset based on: the at least one user interaction, the first plurality of content elements, and/or the second plurality of content elements. The computing device may send the indication of the at least one user interaction (e.g., metadata) to the one or more content servers. The one or more content servers may store the indication of the at least one user interaction (e.g., the metadata) at a databases. In this way, any editing/revision/content generation performed at any one of the plurality of user devices may be synchronized in real-time.

FIG. 20 shows a flowchart of an example method 2000 for improved content creation and synchronization. The method 2000 may be performed in whole or in part by a single computing device, a plurality of computing devices, and the like. For example, any one of the devices, components, units, or modules shown in FIG. 1-3, 5-7, 9, 12-16, or 18 may be configured to perform the method 2000.

A plurality of users (e.g., the users 1506A, 1506B, 1506C) may collaborate via a plurality of user devices (e.g., the user devices 1502A, 1502B, 1502C and/or the user device 102) to create a media asset, such as a webinar, as described herein. For example, the plurality of user devices may each execute an instance of a client application (e.g., the client application 106). The client application may act as a gateway between the plurality of user devices and a studio module (e.g., the studio module 1304). The plurality of users may interact with the studio module to record, generate, and/or edit content for the media asset.

A first user of the plurality of users (e.g., a presenter of the media asset/webinar) may generate first content associated with the media asset via a first user device of the plurality of user devices. For example, the first user may generate, via an instance of the client application and the studio module, first content for the media asset. The first content may comprise recorded audio, video, or a combination thereof. For example, the first content may comprise frames of video and/or audio recorded via the studio module, chunks/segments of video/audio recorded via the studio module, etc.). The first user device may send the first content to a computing device (e.g., the computing device 1510) in communication with the plurality of user devices. The computing device may comprise a server(s), such as a conference server(s).

A second user device of the plurality of user devices may be associated with a second user (e.g., a presenter of the media asset/webinar). The second user may generate, via another instance of the client application and the studio module (e.g., executing on the second user device), second content for the media asset. The second content may comprise recorded audio, video, or a combination thereof. For example, the second content may comprise frames of video and/or audio recorded via the studio module, chunks/segments of video/audio recorded via the studio module, etc.). The second user device may send the second content to the computing device.

At step 2010, the computing device may receive the first content and the second content. For example, the computing device may receive the first content from the first user device, and the computing device may receive the second content from the second user device. At step 2020, the computing device may determine a first plurality of content elements and a second plurality of content elements. For example, the computing device may determine a first plurality of content elements associated with the first content, and the computing device may determine a second plurality of content elements associated with the second content. The first plurality of content elements may comprise, for example, a first identifier, a first beginning timestamp, a first ending timestamp, an identifier for the media asset, a first identifier for the first content, a session identifier associated with the plurality of user devices, a combination thereof, and/or the like. As another example, the first plurality of content elements may comprise one or more portions of the first content itself (e.g., one or more frames of video and/or audio recorded via the studio 1304, one or more chunks/segments of video/audio recorded via the studio module, etc.).

The first plurality of content elements may be sent by the computing device to one or more content servers. Any of the one or more content servers may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein. The one or more content servers may receive the first plurality of content elements and store the same in a database, such as one of the databases D1, D2, D3 shown in FIG. 15. The database may comprise—or be in communication with, for example, the storage subsystem 144, the distribution platform devices 160, the multiple delivery servers 162, the media repositories 164, the storage 240, the asset corpora 320, the curated asset storage 952, the storage 1260, and/or the studio module 1340 described herein.

The computing may determine the second plurality of content elements associated with the second content. The second plurality of content elements may comprise, for example, a second identifier, a second beginning timestamp, a second ending timestamp, the identifier for the media asset, a second identifier for the second content, the session identifier associated with the plurality of user devices, a combination thereof, and/or the like. As another example, the second plurality of content elements may comprise one or more portions of the second content itself (e.g., one or more frames of video and/or audio recorded via the studio module, one or more chunks/segments of video/audio recorded via the studio module, etc.). The second plurality of content elements may be sent by the computing device to the one or more content servers. The one or more content servers may receive the second plurality of content elements and store the same in a database, such as one of the databases D1, D2, D3 shown in FIG. 15.

At step 2030, the computing device may send, to the first user device: the second content, the first plurality of content elements, and the second plurality of content elements to the first user device. For example, the computing device may send the second plurality of content elements and/or an indication thereof to the first user device. The first user device may receive the second plurality of content elements and/or the indication thereof. The first user device may generate (or be caused to generate by the studio module) a user interface of a production environment configured for editing the media asset. For example, the production environment may allow the plurality of users to collaborate via the plurality of user devices to create, revise, etc., etc., the media asset. The production environment may comprise one or more elements of the studio module 1304, such as the template module 1304A described herein. The user interface may facilitate the first user editing, revising, etc. the first content and/or the second content. For example, the user interface may comprise an editing element that shows the first and/or second content represented along a timeline. The first content and/or the second content may be represented along the timeline within the editing element based on the first plurality of content elements and/or the second plurality of content elements.

The first user device may receive, via the user interface, at least one user interaction. For example, the first user, via the first user device and the user interface, may interact with the editing element to edit, revise, etc., the first content or the second content. For example, a first object associated with the first content and a second object associated with the second content (e.g., waveforms of audio) may be generated at the editing element. The first user, via the first user device and the user interface, may generate the at least one user interaction via the editing element with the first content or the second content by interacting with the first object or the second object. The at least one user interaction may comprise one or more of the following: a movement of the first object or the second object along the timeline; a cutting command associated with the first object or the second object; a pasting command associated with the first object or the second object; a re-recording marker associated with the first object or the second object; a fade-in effect applied to the first object or the second object; a fade-out effect applied to the first object or the second object; a filter applied to the first object or the second object; or an adjustment of a level of gain associated with the first object or the second object. Other examples are possible as well.

At step 2040, the computing device may receive an indication of the at least one user interaction. For example, the first user device may send the indication of the at least one user interaction to the computing device. The indication of the at least one user interaction may comprise one or more of the first plurality of content elements or the second plurality of content elements (e.g., based on the type of interaction/what was edited by the first user). At step 2050, the computing device may synchronize the first content and the second content within the media asset. For example, the indication of the at least one user interaction may cause the computing device to synchronize the first content and the second content within the media asset. The computing device may synchronize the first content and the second content within the media asset based on: the at least one user interaction, the first plurality of content elements, and/or the second plurality of content elements. The computing device may send the indication of the at least one user interaction (e.g., metadata) to the one or more content servers. The one or more content servers may store the indication of the at least one user interaction (e.g., the metadata) at a databases. In this way, any editing/revision/content generation performed at any one of the plurality of user devices may be synchronized in real-time.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    capturing, at a first user device of a plurality of user devices, first content during output of a first portion of a media asset at the first user device;
    sending, to at least one content server in communication with the plurality of user devices, the first content, wherein the at least one content server determines, based on the first content, a first plurality of content elements associated with the first content;
    receiving, from the at least one content server, second content associated with the media asset and a second plurality of content elements, wherein the second content is captured at a second user device of the plurality of user devices during output of a second portion of the media asset at the second user device, and wherein the at least one content server determines, based on the second content, the second plurality of content elements;
    outputting, by the first user device, a user interface comprising a first object associated with the first content and a second object associated with the second content;
    receiving, via the user interface, at least one user interaction associated with the first object or the second object; and
    sending, to the at least one content server, an indication of the at least one user interaction, wherein the indication causes the at least one content server to synchronize the first content with the first portion of the media asset, the second content with the second portion of the media asset, and at least one of the first content or the second content with a portion of a supplemental media asset based on the at least one user interaction, the first plurality of content elements, and the second plurality of content elements, and wherein the first content is output with the first portion of the media asset, and the second content is output with the second portion of the media asset, by at least one user device of the plurality of user devices based on the synchronization of the first content with the first portion of the media asset and the second content with the second portion of the media asset.

2. The method of claim 1, wherein the at least one user interaction associates at least one of the first content or the second content with the portion of the supplemental media asset.

3. The method of claim 1, wherein the supplemental media asset comprises at least one of: a slideshow, video content, or a poll.

4. The method of claim 3, wherein the portion of the supplemental media asset comprises at least one of: a slide of the slideshow or a portion of the video content, and wherein at least one of the slide or the portion of the video content are associated with a beginning timestamp and an ending timestamp.

5. The method of claim 1, wherein the first plurality of content elements comprises at least one of:
    a first identifier;
    a first beginning timestamp;
    a first ending timestamp;
    an identifier for the media asset;
    a first identifier for the first content; or
    a session identifier associated with the plurality of user devices; and
    wherein the second plurality of content elements comprises at least one of:
    a second identifier;
    a second beginning timestamp;
    a second ending timestamp;
    the identifier for the media asset;
    a second identifier for the second content; or
    the session identifier associated with the plurality of user devices.

6. The method of claim 1, wherein the user interface further comprises a timeline associated with the media asset, and wherein the at least one user interaction comprises:
    a movement of the first object or the second object along the timeline;
    a cutting command associated with the first object or the second object;
    a pasting command associated with the first object or the second object;
    a re-recording marker associated with the first object or the second object;
    a fade-in effect applied to the first object or the second object;
    a fade-out effect applied to the first object or the second object;
    a filter applied to the first object or the second object; or
    an adjustment of a level of gain associated with the first object or the second object.

7. The method claim 1, wherein the first content and the second content each comprise at least one of: video content or audio content.

8. A method comprising:
    receiving, by at least one content server in communication with a plurality of user devices, first content and second content, wherein the first content is captured at a first user device of the plurality of user devices during output of a first portion of a media asset at the first user device, and wherein the second content is captured at a second user device of the plurality of user devices during output of a second portion of the media asset at the second user device;

determining, based on the first content and the second content, a first plurality of content elements and a second plurality of content elements;

sending the second content, the first plurality of content elements, and the second plurality of content elements to the first user device, wherein the first user device outputs a user interface comprising a first object associated with the first content and a second object associated with the second content;

receiving, from the first user device, an indication of at least one user interaction associated with the user interface and at least one of the first object or the second object; and based on receiving the indication, synchronizing the first content with the first portion of the media asset, the second content with the second portion of the media asset, and at least one of the first content or the second content with a portion of a supplemental media asset based on the at least one user interaction, the first plurality of content elements, and the second plurality of content elements, and wherein the first content is output with the first portion of the media asset, and the second content is output with the second portion of the media asset, by at least one user device of the plurality of user devices based on the synchronization of the first content with the first portion of the media asset and the second content with the second portion of the media asset.

9. The method of claim 8, wherein the at least one user interaction associates at least one of the first content or the second content with the portion of the supplemental media asset.

10. The method of claim 8, wherein the supplemental media asset comprises at least one of: a slideshow, video content, or a poll.

11. The method of claim 10, wherein the portion of the supplemental media asset comprises at least one of: a slide of the slideshow or a portion of the video content, and wherein at least one of the slide or the portion of the video content are associated with a beginning timestamp and an ending timestamp.

12. The method of claim 8, wherein the first plurality of content elements comprises at least one of:
a first identifier;
a first beginning timestamp;
a first ending timestamp;
an identifier for the media asset;
a first identifier for the first content; or
a session identifier associated with the plurality of user devices; and
wherein the second plurality of content elements comprises at least one of:
a second identifier;
a second beginning timestamp;
a second ending timestamp;
the identifier for the media asset;
a second identifier for the second content; or
the session identifier associated with the plurality of user devices.

13. The method of claim 8, wherein the user interface further comprises a timeline associated with the media asset, and wherein the at least one user interaction comprises:
a movement of the first object or the second object along the timeline;
a cutting command associated with the first object or the second object;
a pasting command associated with the first object or the second object;
a re-recording marker associated with the first object or the second object;
a fade-in effect applied to the first object or the second object;
a fade-out effect applied to the first object or the second object;
a filter applied to the first object or the second object; or
an adjustment of a level of gain associated with the first object or the second object.

14. The method claim 8, wherein the first content and the second content each comprise at least one of: video content or audio content.

15. An apparatus comprising:
one or more processors and;
processor-executable instructions that, when executed by the one or more processors, cause the apparatus to:
capture first content during output of a media asset at the apparatus;
send, to at least one content server in communication with a plurality of user devices, the first content, wherein the at least one content server determines, based on the first content, a first plurality of content elements associated with the first content;
receive, from the at least one content server, second content associated with the media asset and a second plurality of content elements, wherein the second content is captured at a second user device of the plurality of user devices during output of a second portion of the media asset at the second user device, and wherein the at least one content server determines, based on the second content, the second plurality of content elements;
output a user interface comprising a first object associated with the first content and a second object associated with the second content;
receive, via the user interface, at least one user interaction associated with the first object or the second object; and
send, to the at least one content server, an indication of the at least one user interaction, wherein the indication causes the at least one content server to synchronize the first content with the first portion of the media asset, and the second content with the second portion of the media asset, and at least one of the first content or the second content with a portion of a supplemental media asset based on the at least one user interaction, the first plurality of content elements, and the second plurality of content elements, and wherein the first content is output with the first portion of the media asset, and the second content is output with the second portion of the media asset, by at least one user device of the plurality of user devices based on the synchronization of the first content with the first portion of the media asset and the second content with the second portion of the media asset.

16. The apparatus of claim 15, wherein the at least one user interaction associates at least one of the first content or the second content with the portion of the supplemental media asset.

17. The apparatus of claim 15, wherein the supplemental media asset comprises at least one of: a slideshow, video content, or a poll.

18. The apparatus of claim 17, wherein the portion of the supplemental media asset comprises at least one of: a slide of the slideshow or a portion of the video content, and wherein at least one of the slide or the portion of the video content are associated with a beginning timestamp and an ending timestamp.

19. The apparatus of claim 15, wherein the first content and the second content each comprise at least one of: video content or audio content.

20. The apparatus of claim 15, wherein the first plurality of content elements comprises at least one of:
- a first identifier;
- a first beginning timestamp;
- a first ending timestamp;
- an identifier for the media asset;
- a first identifier for the first content; or
- a session identifier associated with the plurality of user devices; and wherein the second plurality of content elements comprises at least one of:
- a second identifier;
- a second beginning timestamp;
- a second ending timestamp;
- the identifier for the media asset;
- a second identifier for the second content; or the session identifier associated with the plurality of user devices.

* * * * *